United States Patent
Matsumura et al.

(10) Patent No.: US 6,497,964 B1
(45) Date of Patent: Dec. 24, 2002

(54) COATING COMPOSITIONS AND METHOD FOR THE SURFACE PROTECTION OF PLASTIC SUBSTRATE

(75) Inventors: Kazuyuki Matsumura, Gunma-ken (JP); Masaaki Yamaya, Gunma-ken (JP); Kazuharu Sato, Gunma-ken (JP); Koichi Higuchi, Gunma-ken (JP); Muneo Kudo, Gunma-ken (JP)

(73) Assignees: Shin-Etsu Chemical Co., Ltd., Tokyo (JP); Kabushi Kaishi Toyoda Jidoshokki Seisakusho, Kariya (JP)

( * ) Notice: Subject to any disclaimer, the term of this patent is extended or adjusted under 35 U.S.C. 154(b) by 44 days.

(21) Appl. No.: 09/621,627

(22) Filed: Jul. 21, 2000

(30) Foreign Application Priority Data

Jul. 22, 1999 (JP) ............................ 11-207710
Sep. 28, 1999 (JP) ............................ 11-274059
Sep. 28, 1999 (JP) ............................ 11-274060

(51) Int. Cl.$^7$ .......................... B32B 9/04; B32B 27/36; C08G 77/08

(52) U.S. Cl. .................. 428/447; 428/412; 427/164; 427/204; 427/387; 524/588; 524/858; 524/859; 528/12; 528/21; 528/29; 106/287.1

(58) Field of Search ................. 428/447, 448, 428/412; 427/164, 204, 387

(56) References Cited

U.S. PATENT DOCUMENTS 3,986,997 A * 10/1976 Clark .................. 260/29.2 M
4,051,161 A    9/1977 Proskow
4,278,804 A    7/1981 Ashby et al.
4,555,559 A   11/1985 Kimura et al.
6,214,416 B1 * 4/2001 Sakagami et al. .......... 427/387

* cited by examiner

*Primary Examiner*—Robert Dawson
*Assistant Examiner*—Michael J Feely
(74) *Attorney, Agent, or Firm*—Birch, Stewart, Kolasch & Birch, LLP

(57) ABSTRACT

A composition comprising (1) 0.1–50 parts by weight of the reaction product of a hydroxyl group-containing benzophenone compound with a silane and/or a hydrolyzate thereof and (2) 100 parts by weight of a silane compound and/or a hydrolyzate thereof is applied to a polycarbonate sheet to form a protective coating having mar and weather resistance. A composition comprising the reaction product of a hydroxyl group-containing benzophenone compound with a silane and/or a hydrolyzate thereof is useful for undercoating.

38 Claims, No Drawings

COATING COMPOSITIONS AND METHOD FOR THE SURFACE PROTECTION OF PLASTIC SUBSTRATE

This invention relates to coating compositions for forming mar and weather-resistant protective coatings on plastic substrates, typically polycarbonate resin substrates, and a method for the surface protection of plastic substrates.

BACKGROUND OF THE INVENTION

As glazing substitutes, shatterproof or highly shatter resistant transparent materials have been widely utilized for these decades. For example, plastic substrates, especially polycarbonate resins have superior transparency, impact resistance and heat resistance and are currently used as structural members instead of glass in a variety of applications including building and vehicle windows and instrument covers.

The polycarbonate resins, however, are inferior to glass in surface properties such as mar resistance and weather resistance. It is desired to improve the surface properties of polycarbonate resin parts. Nowadays, polycarbonate resin parts for use as vehicle windows and acoustic barrier walls along highways are required to withstand more than 10 years of weathering.

Known means for improving the weather resistance of polycarbonate resin parts include the lamination of a weather resistant acrylic resin film on the surface of a polycarbonate resin substrate and the formation of a ultraviolet absorber-containing resin layer on the resin surface, for example, by co-extrusion.

For improving the mar resistance of polycarbonate resin parts, it is known to coat thermosetting resins such as polyorganosiloxanes and melamine resins and to coat photocurable resins such as polyfunctional acrylic resins.

As to the manufacture of transparent articles having both weather resistance and mar resistance, JP-A 56-92059 and JP-A 1-149878 disclose ultraviolet-absorbing transparent substrates having a primer layer loaded with a large amount of UV absorber added and a protective coating of colloidal silica-containing polysiloxane paint overlying the primer layer. However, several problems arise with this approach. The addition of a large amount of UV absorber, especially to the primer layer can adversely affect the adhesion to the substrate and to the protective coating of colloidal silica-containing polysiloxane paint to be applied on the primer layer. During heat curing step, the UV absorber can volatilize off. On outdoor use over a long period of time, the UV absorber will gradually bleed out, causing whitening. From the mar resistance standpoint, it is impossible to add a large amount of UV absorber to the protective coating of colloidal silica-containing polysiloxane.

From these considerations, it was also attempted to fix a UV absorber by silyl modification. For example, JP-A57-21476 discloses alkylcarbamyl addition products of alkoxysilyl or alkanoylsilyl. This method, however, involves complex steps and is uneconomical.

It is also proposed to produce silyl-modified UV absorbers by reacting aromatic UV absorbers such as 2,4-dihydroxybenzophenone with silane compounds containing hydroxyl and epoxy groups. The reaction is effected between hydroxyl groups in the former and epoxy groups in the latter in the presence of tetramethylammonium chloride as disclosed in JP-A 58-10591 and JP-A 58-8766 or an aluminum chelate as disclosed in JP-B 3-62177.

Since these silyl-modified UV absorbers have alkoxysilyl groups which undergo condensation reaction during the heat curing step, the absorbers are advantageously fixed within the coating during the heat curing step so that the absorbers might not bleed out. However, these UV absorbers are less resistant to weathering, probably because the conjugated system of the UV absorber is altered by silyl modification. In general, the silyl-modified UV absorbers are added to the outermost protective coating layer. In the prior art, it has never been attempted to add the silyl-modified UV absorbers to primer or undercoating compositions.

SUMMARY OF THE INVENTION

An object of the invention is to provide a coating composition having improved long-term weather resistance and surface protection performance on a plastic substrate, and suited as an outermost coating on such a substrate. Another object is to provide an article having a coating of the coating composition on a substrate.

A further object is to provide an undercoating composition comprising a silyl-modified UV absorber and capable of forming a protective coating having improved mar and weather resistance. A still further object is to provide a method for protecting a surface of a plastic substrate using the undercoating composition.

We have found that significant improvements are made when a protective coating composition comprising (1) the reaction product of a hydroxyl group-containing benzophenone compound with a silane and/or a (partial) hydrolyzate thereof, preferably the reaction product obtained by reacting a compound of the following general formula (A) with an epoxy group-containing silane of the following general formula (B) in the presence of a catalyst, and/or a (partial) hydrolyzate thereof, (2) a silane of the following general formula (C) and/or a (partial) hydrolyzate thereof, and optionally and preferably, (3) a microparticulate inorganic oxide containing titanium, cerium or zinc, and capable of absorbing light with a wavelength of up to 400 nm, or a protective coating composition comprising a co-hydrolyzate of components (1) and (2), and optionally and preferably, component (3) is applied and cured onto plastic substrates, typically polycarbonate resins. The benzophenone organic UV absorber does not bleed out because of silyl modification or detract from mar resistance because of good compatibility with component (2). The benzophenone organic UV absorber containing at least three OH groups in a molecule maintains a UV absorbing capability substantially unchanged despite silyl modification. The use of benzophenone organic UV absorber in combination with the microparticulate inorganic oxide capable of absorbing light with a wavelength of up to 400 nm achieves the synergistic effect of effectively absorbing light in a wide UV region for significantly improving the weather resistance of plastic substrates, typically polycarbonate resins.

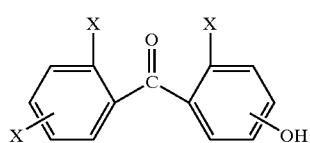
(A)

In formula (A), X, which may be the same or different, is hydrogen or a hydroxyl group, and at least one X is a hydroxyl group.

$$R^1_a SiR^2_b (OR^3)_{4-a-b} \quad (B)$$

In formula (B), $R^1$ is an epoxy group-containing organic group, $R^2$ is an alkyl group of 1 to 10 carbon atoms or aryl group, $R^3$ is hydrogen or a substituted or unsubstituted monovalent hydrocarbon group of 1 to 10 carbon atoms which may contain an oxygen atom, "a" is equal to 1 or 2, "b" is equal to 0 or 1, and the sum of a and b is equal to 1 or 2.

$$R^4{}_m SiR^2{}_n(OR^3)_{4-m-n} \quad (C)$$

In formula (C), $R^4$ is a substituted or unsubstituted monovalent hydrocarbon group of 1 to 10 carbon atoms, $R^2$ is an alkyl group of 1 to 10 carbon atoms or aryl group, $R^3$ is hydrogen or a substituted or unsubstituted monovalent hydrocarbon group of 1 to 10 carbon atoms which may contain an oxygen atom, m and n each are equal to 0, 1 or 2, and the sum of m and n is equal to 0, 1 or 2.

Seeking for an undercoating composition capable of improving the adhesion and weather resistance of molded parts of thermoplastic resins such as polycarbonate which are subsequently coated with an organopolysiloxane coating, we have found that when the reaction product of a hydroxyl group-containing benzophenone compound with a silane and/or a (partial) hydrolyzate thereof, preferably the reaction product obtained by reacting a compound of the general formula (A) with an epoxy group-containing silane of the general formula (B) and/or a (partial) hydrolyzate thereof is added to the undercoating composition, the reaction product is so compatible with other components in the undercoating composition owing to the effect of silyl groups that a large amount of the reaction product may be added without detracting from the adhesion of the undercoating composition to the substrate or the protective coating. The UV absorber is firmly fixed in the undercoat, eliminating a whitening phenomenon caused by bleeding-out with time. Since the undercoat contains a large amount of the UV absorber, a UV absorber which can adversely affect mar resistance need not be added to the organopolysiloxane coating or if added, only a small amount thereof is satisfactory.

Accordingly, a first embodiment of the invention provides a protective coating composition having improved weather resistance, comprising (1) 0.1 to 50 parts by weight of the reaction product of a hydroxyl group-containing benzophenone compound with a silane and/or a (partial) hydrolyzate thereof, and (2) 100 parts by weight of a silane compound of the following general formula (C):

$$R^4{}_m SiR^2{}_n(OR^3)_{4-m-n} \quad (C)$$

wherein $R^4$ is a substituted or unsubstituted monovalent hydrocarbon group of 1 to 10 carbon atoms, $R^2$ is an alkyl group of 1 to 10 carbon atoms or aryl group, $R^3$ is hydrogen or a substituted or unsubstituted monovalent hydrocarbon group of 1 to 10 carbon atoms which may contain an oxygen atom, m and n each are equal to 0, 1 or 2, and the sum of m and n is equal to 0, 1 or 2, and/or a (partial) hydrolyzate thereof.

A second embodiment of the invention provides a protective coating composition having improved weather resistance, comprising a co-hydrolyzate resulting from co-hydrolysis of (1) 0.1 to 50 parts by weight of the reaction product of a hydroxyl group-containing benzophenone compound with a silane and/or a (partial) hydrolyzate thereof, and (2) 100 parts by weight of a silane compound of the following general formula (C):

$$R^4{}_m SiR^2{}_n(OR^3)_{4-m-n} \quad (C)$$

wherein $R^4$, $R^2$, $R^3$, m and n are as defined above and/or a (partial) hydrolyzate thereof.

Also contemplated herein is an article comprising a substrate and a weather resistant protective coating formed on a surface of the substrate from the protective coating composition defined above.

A third embodiment of the invention provides an undercoating composition comprising the reaction product of a hydroxyl group-containing benzophenone compound with a silane and/or a (partial) hydrolyzate thereof.

A fourth embodiment of the invention provides an undercoating composition comprising (1) 0.1 to 50 parts by weight of the reaction product and/or the (partial) hydrolyzate of the third embodiment, and (5) 100 parts by weight of an organic copolymer comprising 0.1 to 50% by weight of an alkoxysilyl group-containing acrylic and/or vinyl monomer and 99.9 to 50% by weight of another monomer copolymerizable therewith.

A fifth embodiment of the invention provides an undercoating composition of the third or fourth embodiment further comprising (6) 0.1 to 50 parts by weight of a compound containing a nitrogen atom and an alkoxysilyl group in a molecule.

A sixth embodiment of the invention provides an undercoating composition of the foregoing embodiments further comprising (7) 0.1 to 10 parts by weight of a light stabilizer having at least one cyclic hindered amine structure in a molecule.

In a further aspect, the invention provides a method for protecting a plastic substrate, comprising the steps of:

(i) applying an organic solvent solution of the undercoating composition of the third or fourth embodiment onto a plastic substrate, (ii) evaporating the organic solvent and curing the coating of the undercoating composition, (iii) applying the protective coating composition of the first or second embodiment or a colloidal silica-containing organopolysiloxane composition onto the undercoat, said colloidal silica-containing organopolysiloxane composition comprising a hydrolyzate or co-hydrolyzate of a silane compound of the following general formula (C'):

$$R^5{}_m SiR^2{}_n(OR^3)_{4-m-n} \quad (C')$$

wherein $R^5$ is a $C_{1-10}$ alkyl group, aryl group, halogenated alkyl group, halogenated aryl group, alkenyl group or an organic group having an epoxy, (meth)acryloxy, mercapto, amino or cyano group, $R^2$ is an alkyl group of 1 to 10 carbon atoms or aryl group, $R^3$ is hydrogen or a substituted or unsubstituted monovalent hydrocarbon group of 1 to 10 carbon atoms which may contain an oxygen atom, m and n each are equal to 0, 1 or 2, and the sum of m and n is equal to 0, 1 or 2, and colloidal silica, and (iv) heating the top coating for curing.

DESCRIPTION OF THE PREFERRED EMBODIMENT

In the weather resistant protective coating composition according to the first aspect of the invention, a first component is the reaction product of a hydroxyl group-containing benzophenone compound with a silane and/or a (partial) hydrolyzate thereof. The silane is reacted with hydroxyl groups on the benzophenone compound. Any benzophenone compound having at least one hydroxyl group may be used although benzophenone compounds of the following general formula (A) are preferred. Any silane compound having a functional group capable of reacting with hydroxyl groups on the benzophenone compound may be used although epoxy group-containing silane compounds are preferred.

Accordingly, the preferred first component is the reaction product obtained by reacting a benzophenone compound of the following general formula (A) with an epoxy group-containing organoxysilane of the following general formula (B) in the presence of a catalyst, and/or a (partial) hydrolyzate thereof. Specifically the reaction product is obtained by reacting hydroxyl groups on the benzophenone UV absorber (A) with epoxy groups on the epoxy group-containing organoxysilane (B).

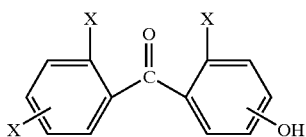

(A)

In formula (A), X, which may be the same or different, is hydrogen or a hydroxyl group, and at least one X is a hydroxyl group.

(B)

In formula (B), $R^1$ is an epoxy group-containing organic group, $R^2$ is an alkyl group of 1 to 10 carbon atoms or aryl group, $R^3$ is hydrogen or a substituted or unsubstituted monovalent hydrocarbon group of 1 to 10 carbon atoms which may contain an oxygen atom, "a" is equal to 1 or 2, "b" is equal to 0 or 1, and the sum of a and b is equal to 1 or 2.

Examples of the benzophenone compound (A) which is one reactant from which component (1) is prepared are given below.

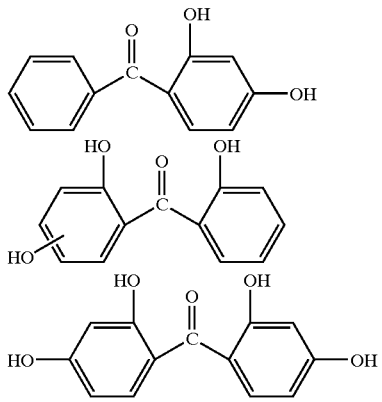

Of these, 2,2', 4,4'-tetrahydroxybenzophenone is especially preferred because of its UV absorbing capability.

On the other hand, the epoxy group-containing organoxysilane (B) is represented by

(B).

In formula (B), $R^2$ is an alkyl group of 1 to 10 carbon atoms or aryl group, for example, methyl, ethyl, propyl, hexyl, decyl or phenyl.

$R^3$ is hydrogen or a substituted or unsubstituted monovalent hydrocarbon group of 1 to 10 carbon atoms which may contain an oxygen atom. The monovalent hydrocarbon groups include alkyl, alkenyl, alkoxyalkyl, acyl and aryl groups, for example, methyl, ethyl, propyl, isopropyl, butyl, hexyl, phenyl, isopropenyl, methoxyethyl and acetyl.

The letter "a" is equal to 1 or 2, "b" is equal to 0 or 1, and a+b is equal to 1 or 2.

$R^1$ is an epoxy group-containing organic group, examples of which are given below.

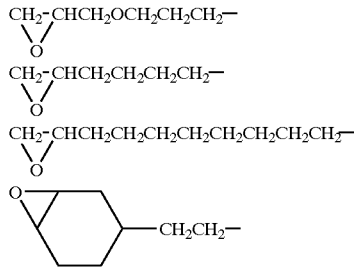

Illustrative examples of the epoxy group-containing silane (B) include γ-glycidoxypropyltrimethoxysilane, γ-glycidoxypropylmethyldimethoxysilane, γ-glycidoxypropyltriethoxysilane, γ-glycidoxypropylmethyldiethoxysilane, β-(3,4-epoxycyclohexyl)ethyltrimethoxysilane, β-(3,4-epoxycyclohexyl)ethylmethyldimethoxysilane, β-(3,4-epoxycyclohexyl)ethyltriethoxysilane, and β-(3,4-epoxycyclohexyl)ethylmethyldiethoxysilane. From the standpoints of solubility in protective coating compositions and reactivity with benzophenone compounds, the preferred silane compounds are γ-glycidoxypropyltrimethoxysilane, β-(3,4-epoxycyclohexyl)ethyltrimethoxysilane, γ-glycidoxypropylmethyldimethoxysilane, and β-(3,4-epoxycyclohexyl)ethylmethyldimethoxysilane.

In effecting the reaction, compounds (A) and (B) may be respectively used alone or in admixture of two or more.

The amount of compound (B) used is not critical although it is preferred to use 0.5 to 3 mol, more preferably 1.0 to 2.5 mol of compound (B) per mol of compound (A). The reaction product with less than 0.5 mol of compound (B) may become less soluble when added to a coating composition, resulting in reduced fixation to the substrate and poor weather resistance. With more than 3 mol of compound (B), the absolute amount of compound (A) participating in UV absorption may become small, leading to insufficient UV absorption.

The catalysts used in the reaction are preferably quaternary ammonium salts as disclosed in JP-A 58-10591. Exemplary quaternary ammonium salts include tetramethylammonium chloride, tetraethylammonium chloride, benzyltrimethylammonium chloride, and benzyltriethylammonium chloride. The amount of the catalyst added is not critical although it is preferred to use 0.005 to 10 parts, more preferably 0.01 to 5 parts by weight of the catalyst per 100 parts by weight of compounds (A) and (B) combined. Less than 0.005 part of the catalyst may require the reaction to continue for a longer time. More than 10 parts of the catalyst can adversely affect the stability of the coating composition to which component (1) is added.

The reaction is usually effected in the presence of the catalyst by heating compounds (A) and (B) at a temperature of 50 to 150° C. for about 4 to 20 hours. The reaction may be effected in a solventless system or in a solvent in which both compounds (A) and (B) are dissolved. The use of a solvent is rather preferable for ease of reaction control and handling. Suitable solvents include toluene, xylene, ethyl acetate and butyl acetate.

According to the invention, a partial or complete hydrolyzate of the above-described reaction product may also be used. Hydrolysis of the reaction product is effected by adding water to a lower alcohol solution of the reaction product in the presence of an acid catalyst. Exemplary lower alcohols are methanol, ethanol, isopropanol and butanol. Solvents compatible with these alcohols include ketones such as acetone and acetylacetone, esters such as ethyl acetate and isobutyl acetate, and ethers such as propylene glycol monomethyl ether, dipropylene glycol monomethyl ether, and diisopropyl ether.

A second component in the coating composition of the invention is a silane compound of the following general formula (C) and/or a (partial) hydrolyzate thereof.

$$R^4{}_m SiR^2{}_n (OR^3)_{4-m-n} \quad (C)$$

In formula (C), $R^4$ is a substituted or unsubstituted monovalent hydrocarbon group of 1 to 10 carbon atoms. Included are alkyl, aryl, halogenated alkyl, halogenated aryl, and alkenyl groups and substituted monovalent hydrocarbon groups in which some or all of the hydrogen atoms in the foregoing groups are replaced by (meth)acryloxy, mercapto, amino or cyano groups. Illustrative examples include alkyl groups such as methyl, ethyl, propyl, isopropyl, butyl, hexyl, decyl, and cyclohexyl; aryl groups such as phenyl and phenethyl; halogenated alkyl groups such as 3-chloropropyl, 3,3,3-trifluoropropyl, and 3,3,4,4,5,5,6,6,6-nonafluorohexyl; halogenated aryl groups such as p-chlorophenyl; alkenyl groups such as vinyl, allyl, 9-decenyl and p-vinylbenzyl; (meth)acryloxy group-containing organic groups such as γ-methacryloxypropyl and γ-acryloxypropyl; mercapto group-containing organic groups such as γ-mercaptopropyl and p-mercaptomethylphenylethyl; amino group-containing organic groups such as Γ-aminopropyl and (β-aminoethyl)-γ-aminopropyl; and cyano group-containing organic groups such as β-cyanoethyl. It is noted that $R^2$ and $R^3$ are as defined above in formula (B). The letters m and n each are equal to 0, 1 or 2, and m+n is equal to 0, 1 or 2. The silane compounds used herein function as an adhesive binder.

Illustrative examples of the silane compound satisfying the above conditions include
    trialkoxy or triacyloxysilanes such as
        methyltrimethoxysilane,
        methyltriethoxysilane,
        methyltris(2-methoxyethoxy)silane,
        methyltriacetoxysilane,
        methyltripropoxysilane,
        methyltriisopropenoxysilane,
        methyltributoxysilane,
        ethyltrimethoxysilane,
        ethyltriethoxysilane,
        vinyltrimethoxysilane,
        vinyltriethoxysilane,
        vinyltriacetoxysilane,
        vinyltris(2-methoxyethoxy)silane,
        vinyltriisopropenoxysilane,
        phenyltrimethoxysilane,
        phenyltriethoxysilane,
        phenyltriacetoxysilane,
        γ-chloropropyltrimethoxysilane,
        γ-chloropropyltriethoxysilane,
        γ-chloropropyltripropoxysilane,
        3,3,3-trifluoropropyltrimethoxysilane,
        γ-methacryloxypropyltrimethoxysilane,
        γ-acryloxypropyltrimethoxysilane,
        γ-aminopropyltrimethoxysilane,
        γ-aminopropyltriethoxysilane,
        γ-mercaptopropyltrimethoxysilane,
        γ-mercaptopropyltriethoxysilane,
        N-(β-aminoethyl)-γ-aminopropyltrimethoxysilane, and
        γ-cyanoethyltrimethoxysilane;
    dialkoxysilanes or diacyloxysilanes such as
        dimethyldimethoxysilane,
        dimethyldiethoxysilane,
        dimethyldi(2-methoxyethoxy) silane,
        dimethyldiacetoxysilane,
        dimethyldipropoxysilane,
        dimethyldiisopropenoxysilane,
        dimethyldibutoxysilane,
        vinylmethyldimethoxysilane,
        vinylmethyldiethoxysilane,
        vinylmethyldiacetoxysilane,
        vinylmethyldi(2-methoxyethoxy)silane,
        vinylmethyldiisopropenoxysilane,
        phenylmethyldimethoxysilane,
        phenylmethyldiethoxysilane,
        phenylmethyldiacetoxysilane,
        γ-propylmethyldimethoxysilane,
        γ-propylmethyldiethoxysilane,
        γ-propylmethyldipropoxysilane,
        3,3,3-trifluoropropylmethyldimethoxysilane,
        γ-methacryloxypropylmethyldimethoxysilane,
        γ-acryloxypropylmethyldimethoxysilane,
        γ-aminopropylmethyldimethoxysilane,
        γ-aminopropylmethyldiethoxysilane,
        γ-mercaptopropylmethyldimethoxysilane,
        γ-mercaptopropylmethyldiethoxysilane,
        γ-mercaptopropylmethyldiethoxysilane,
        N-(β-aminoethyl)-γ-aminopropylmethyldimethoxysilane, and
        β-cyanoethylmethyldimethoxysilane;
    tetraalkoxysilanes such as methyl silicate, ethyl silicate, n-propyl silicate, n-butyl silicate, sec-butyl silicate, and t-butyl silicate. Partial or complete hydrolyzates of these silane compounds are also useful.

These silane compounds and/or (partial) hydrolyzates thereof may be used alone or in admixture of two or more.

The (partial) hydrolyzates of the above silane compounds are obtained, for example, by adding water to a lower alcohol solution of the silane compound in the presence of an acid catalyst. Exemplary lower alcohols are methanol, ethanol, isopropanol and butanol. Solvents compatible with these alcohols include ketones such as acetone and acetylacetone, esters such as ethyl acetate and isobutyl acetate, and ethers such as propylene glycol monomethyl ether, dipropylene glycol monomethyl ether, and diisopropyl ether.

In the protective coating composition of the invention, 0.1 to 50 parts, preferably 0.5 to 50 parts, and especially 1 to 30 parts by weight of the reaction product and/or its (partial) hydrolyzate as component (1) is blended with 100 parts by weight as solids of the silane compound and/or its (partial) hydrolyzate as component (2). Blending of more than 50 parts of component (1) is uneconomical whereas less than 0.1 part of component (1) fails to provide desired weather resistance.

In the protective coating composition of the invention, a microparticulate inorganic oxide is preferably blended as a third component. This component is also designated an inorganic UV absorber since it is a microparticulate inorganic oxide capable of absorbing detrimental light rays with a wavelength of up to 400 nm which can cause decomposition and degradation of organic compounds. Since oxides of titanium, cerium and zinc have an ability to absorb light rays of up to 400 nm in wavelength, the microparticulate inorganic oxide must contain at least one of titanium, cerium and zinc. If necessary, a metal oxide other than the above-described ones is added to the inorganic oxide particles in any desired manner for the purpose of stabilizing the particles or improving weather resistance, and as long as the light absorbing ability is not impaired. The manner of adding the other metal oxide includes simple addition, mechanical adsorption of the other metal oxide to the periphery of inorganic oxide particles, coating of inorganic oxide particles on their surface with a thin film of the other metal oxide, formation of mixed crystals by the sol-gel method, and doping of inorganic oxide particles with the other metal oxide in crystal form. When mixed crystals are formed, the content of titanium, cerium or zinc is preferably at least 50%, especially at least 60% by weight. Examples of the other metal include Si (silica), Al (alumina), Sn (tin oxide), Zr (zirconia), Sb (antimony oxide), Fe (iron oxide), and rare earth metals (rare earth metal oxides) though not limited thereto. Of these, Si, Al, Sn and Zr are preferred.

The inorganic oxide particles should preferably have a particle size of 1 to 300 mμ, more preferably 1 to 200 mμ. Particles with a size of greater than 300 mμ may adversely affect light transmission. Particles with a size of less than 1 mμ are inadequate since they are unstable and difficult to prepare. The inorganic oxide particles may be used in the form of powder, water dispersion or organic solvent dispersion.

In the protective coating composition of the invention, 0 to 100 parts, preferably 0.1 to 100 parts, more preferably 0.5 to 100 parts, and especially 1 to 80 parts by weight of the inorganic oxide particles (3) is blended with 100 parts by weight as solids of the silane compound and/or its (partial) hydrolyzate (2). Less than 0.1 part of component (3) is ineffective for further improving weather resistance and achieving the combined effect with component (1). Blending of more than 100 parts of component (3) may adversely affect film strength and film transparency and is uneconomical.

In the second embodiment of the invention, the protective coating composition contains a co-hydrolyzate resulting from co-hydrolysis of the reaction product and/or its (partial) hydrolyzate (1) and the silane compound and/or its (partial) hydrolyzate (2). This means that the reaction product and/or its (partial) hydrolyzate (1) is previously incorporated into the hydrolyzate of the silane compound (2). Also in this embodiment, hydrolysis is effected by adding water to a lower alcohol solution of the reaction product and/or its (partial) hydrolyzate (1) and the silane compound and/or its (partial) hydrolyzate (2) in the presence of an acid catalyst. Exemplary lower alcohols are methanol, ethanol, isopropanol and butanol.

In this embodiment, 0.1 to 50 parts, preferably 2 to 10 parts by weight of the reaction product and/or its (partial) hydrolyzate as component (1) is mixed with 100 parts by weight of the silane compound and/or its (partial) hydrolyzate as component (2). More than 50 parts of component (1) is uneconomical and causes gelation during reaction leading to non-uniformity whereas less than 0.1 part of component (1) fails to provide desired weather resistance.

Where the microparticulate inorganic oxide (3) is blended in the coating composition of the second embodiment, preferably 0 to 100 parts, more preferably 0.1 to 100 parts, most preferably 2 to 20 parts by weight of component (3) is blended per 100 parts by weight of the silane compound and/or its (partial) hydrolyzate (2).

In the protective coating composition of the invention, colloidal silica is preferably blended as a fourth component. Colloidal silica is blended in an amount of 1 to 200 parts, especially 10 to 150 parts by weight of per 100 parts by weight of component (2). One exemplary blending procedure is by mixing 20 to 90 parts by weight of the silane compound and/or its (partial) hydrolyzate (2) with 10 to 80 parts by weight as solids of a colloidal silica containing silica fines having a particle size of 1 to 100 nm to a total amount of 100 parts by weight. The mixture is diluted with alcohol, water or water-miscible solvent to a nonvolatile concentration of 15 to 20% by weight. The dilution is ripened at room temperature for about 3 to 5 days or at 40 to 60° C. for about 10 to 15 hours. The term "colloidal silica" is a dispersion of silica fines in water or an alcohol such as methanol, ethanol, isobutanol or diacetone alcohol.

Also, upon the above-described hydrolysis, the colloidal silica may be added along with the acid catalyst.

To the protective coating composition, a buffer solution and a curing catalyst are preferably added so as to provide adequate abrasion resistance. Examples of the curing catalyst include dimethylamine, acetic ethanol amine, formic dimethylaniline, benzoic acid, tetraethylammonium salts, sodium acetate, sodium propionate, sodium formate, and trimethylammonium benzoyl acetate. An appropriate amount of the curing catalyst added is 0.01 to 1 part, especially 0.02 to 0.4 part by weight per 100 parts by weight as solids of the protective coating composition.

From the standpoint of insuring stability, the composition is preferably adjusted to pH 2 to 7, at which silanol groups remain stable, and especially pH 3 to 6. The buffer used for pH adjustment may be a combination of acidic and basic compounds, for example, a combination of acetic acid and sodium acetate and a combination of disodium hydrogen phosphate and citric acid.

In the protective coating composition, well-known additives commonly used in conventional coating compositions are blended if necessary.

The protective coating composition is useful in protecting surfaces of various articles, especially plastic articles. Specifically the coating composition is applied to an article substrate to form a protective coating thereon. The plastic article substrates to which the composition is applicable include those of polycarbonate, polystyrene, modified acrylic resins, urethane resins, thiourethane resins, polycondensates of halogenated bisphenol A and ethylene glycol, acrylic urethane resins, halogenated aryl group-containing acrylic resins, and sulfur-containing resins. The benefits become more outstanding when the coating composition is applied to transparent plastic substrates, and especially polycarbonate resins.

When the coating composition is applied to an article substrate to form a protective coating thereon, it is preferred that a primer layer intervenes between the substrate and the coating in order to enhance the adhesion to the substrate, especially plastic substrate. The primer for forming the primer layer is preferably based on a hydrolyzable silyl group-containing vinyl polymer.

The hydrolyzable silyl group-containing vinyl polymer used in the primer is derived by incorporating 0.1 to 50%, especially 0.5 to 20% by weight of a silane coupling agent into a vinyl monomer. The vinyl monomer used herein is selected from among alkyl methacrylates such as methyl methacrylate, butyl methacrylate and 2-ethylhexyl methacrylate; alkyl acrylates such as methyl acrylate, ethyl acrylate, and butyl acrylate; vinyl ethers such as glycidyl methacrylate, acrylamide, acrylonitrile, vinyl acetate, ethyl vinyl ether, butyl vinyl ether, and hexyl vinyl ether; styrene and ethylene glycol dimethacrylate, and mixtures thereof. The silane coupling agent is selected from among vinyltrimethoxysilane, vinyltriethoxysilane, vinyltris(β-methoxyethoxy)silane, vinylmethyldimethoxysilane, vinylmethyldiethoxysilane, γ-glycidoxypropyltrimethoxysilane, γ-glycidoxypropylmethyldimethoxysilane, γ-methacryloxypropyltrimethoxysilane, γ-methacryloxypropylmethyldimethoxysilane, acryloxypropyltrimethoxysilane, acryloxypropylmethyldimethoxysilane, N-β-(aminoethyl)-γ-aminopropyltrimethoxysilane, N-β-(aminoethyl)-γ-aminopropyltriethoxysilane, N-β-(aminoethyl)-γ-aminopropylmethyldimethoxysilane, and N-β-(aminoethyl)-γ-aminopropylmethyldiethoxysilane, and mixtures thereof. More than 50% by weight of the silane coupling agent would invite a higher hardness, poor flexibility and economic disadvantage. With less than 0.1% by weight of the silane coupling agent, the primer layer would have insufficient substrate adhesion and hardness. The hydrolyzable silyl group-containing vinyl polymer is readily obtained by adding a radical polymerization initiator to a solution of the above-described monomer and silane coupling agent, followed by heating to effect reaction. The initiator is selected from peroxides such as dicumyl peroxide and benzoyl peroxide and azo compounds such as azobisisobutyronitrile.

A solvent is used in the primer. Useful solvents include diacetone alcohol, propylene glycol monomethyl ether, ethylene glycol monomethyl ether, propylene glycol monoethyl ether, ethylene glycol monoethyl ether, isobutyl alcohol, isopropyl alcohol, n-butyl alcohol, n-propyl alcohol, acetone, methyl ethyl ketone, methyl isobutyl ketone, acetyl acetone, ethyl acetate, butyl acetate, xylene, and toluene. On use, the primer composition is generally diluted with the solvent into a solution containing 5 to 10% by weight of the hydrolyzable silyl group-containing vinyl polymer.

To the primer, ultraviolet absorbers may be added. Preferred are organic UV absorbers which are fully compatible with the hydrolyzable silyl group-containing vinyl polymer. Derivatives of compounds having a hydroxybenzophenone, benzotriazole, cyanoacrylate or triazine main skeleton are especially preferred. Also acceptable are polymers such as vinyl polymers having such a UV absorber incorporated on a side chain. Exemplary UV absorbers are 2,4'-dihydroxybenzophenone, 2,2', 4,4'-tetrahydroxybenzophenone, 2-hydroxy-4-methoxybenzophenone, 2-hydroxy-4-methoxybenzophenone-5-sulfonic acid, 2-hydroxy-4-n-octoxybenzophenone, 2-hydroxy-4-n-dodecyloxybenzophenone, 2-hydroxy-4-n-benzyloxybenzophenone, 2,2'-dihydroxy-4,4'-dimethoxybenzophenone, 2,2'-dihydroxy-4,4'-diethoxybenzophenone, 2,2'-dihydroxy-4,4'-dipropoxybenzophenone, 2,2'-dihydroxy-4,4'-dibutoxybenzophenone, 2,2'-dihydroxy-4-methoxy-4'-propoxybenzophenone, 2,2'-dihydroxy-4-methoxy-4'-butoxybenzophenone, 2,3,4-trihydroxybenzophenone, 2-(2-hydroxy-5-t-methylphenyl)benzotriazole, 2-(2-hydroxy-5-t-octylphenyl)benzotriazole, 2-(2-hydroxy-3,5-di-t-butylphenyl)benzotriazole, ethyl-2-cyano-3,3-diphenyl acrylate, 2-ethylhexyl-2-cyano-3,3-diphenyl acrylate, 2-(2-hydroxy-4-hexyloxyphenyl)-4,6-diphenyltriazine, 4-(2-acryloxyethyl)-2-hydroxybenzophenone polymer, and 2-(2'-hydroxy-5'-methacryloxyethylphenyl)-2H-benzotriazole polymer. Of these, 2,2', 4,4'-tetrahydroxybenzophenone is most preferred from the standpoints of compatibility with the primer and volatility. These organic UV absorbers may be used in admixture of two or more.

In the primer, the reaction product and/or its (partial) hydrolyzate defined above as component (1) may account for 10 to 100% by weight of the organic UV absorber.

An appropriate amount of the organic UV absorber is 0.5 to 15 parts, especially 0.5 to 7 parts by weight per 100 parts by weight of the hydrolyzable silyl group-containing vinyl polymer. More than 15 parts of the organic UV absorber would precipitate out on the coating to aggravate an outer appearance, and reduce the stability of the hydrolyzable silyl group-containing vinyl polymer. With less than 0.5 parts of the organic UV absorber, the desired weather resistance would not be obtained.

To the primer, a light stabilizer having at least one cyclic hindered amine structure in a molecule may be added for improving weather resistance. The light stabilizer used herein should preferably be fully soluble in the solvent of the primer, compatible with the hydrolyzable silyl group-containing vinyl polymer, and low volatile.

An appropriate amount of the light stabilizer added is 0.03 to 2 parts by weight per 100 parts by weight of the hydrolyzable silyl group-containing vinyl polymer. More than 2 parts of the light stabilizer would detract from the adhesion of the primer layer.

Illustrative examples of the light stabilizer include 3-dodecyl-1-(2,2,6,6-tetramethyl-4-piperidinyl)pyrrolidine-2,5-dione, N-methyl-3-dodecyl-1-(2,2,6,6-tetramethyl-4-piperidinyl)pyrrolidine-2,5-dione, N-acetyl-3-dodecyl-1-(2,2,6,6-tetramethyl-4-piperidinyl)pyrrolidine-2,5-dione, bis(2,2,6,6-tetramethyl-4-piperidyl) sebacate, bis(1,2,2,6,6-pentamethyl-4-piperidyl) sebacate, tetrakis(2,2,6,6-tetramethyl-4-piperidyl) 1,2,3,4-butanetetracarboxylate, tetrakis(1,2,2,6,6-pentamethyl-4-piperidyl) 1,2,3,4-butanetetracarboxylate, a condensate of 1,2,3,4-butanetetracarboxylic acid with 2,2,6,6-tetramethylpiperidinol and tridecanol, 8-acetyl-3-dodecyl-7,7,9,9-tetramethyl-1,3,8-triazaspiro[4,5]decane-2,4-dione, a condensate of 1,2,3,4-butanetetracarboxylic acid with 1,2,6,6-tetramethyl-4-piperidinol and β,β,β,β'-tetramethyl-3,9-(2,4,8,10-tetraoxaspiro[5,5]undecane)diethanol, and a condensate of 1,2,3,4-butanetetracarboxylic acid with 2,2,6,6-tetramethyl-4-piperidinol and β,β,β,β'-tetramethyl-3,9-(2,4,8,10-tetraoxaspiro[5,5]undecane)diethanol. For the purpose of fixing the light stabilizer, there may be also used silyl-modified light stabilizers as disclosed in JP-B 61-56187, for example, 2,2,6,6-tetramethylpiperidino-4-propyltrimethoxysilane, 2,2,6,6-tetramethylpiperidino-4-propylmethyldimethoxysilane, 2,2,6,6-tetramethylpiperidino-4-propyltriethoxysilane, and 2,2,6,6-tetramethylpiperidino-4-propylmethyldiethoxysilane. These light stabilizers may be used in admixture of two or more.

Most preferably, the protective coating composition of the invention is used in forming the outermost layer. Any of well-known application methods such as spraying, dipping, curtain flow, and roll coating may be used. The coating generally has a thickness of about 1 to 10 μm, preferably about 2 to 5 μm in the dry state. A coating thinner than 1 μm may accomplish less surface protection. A coating thicker than 10 μm is likely to crack upon heat curing. In applying the primer, any of well-known methods may be used.

Heat curing conditions are not critical although heating at 100 to 130° C. for about one hour is preferred.

Next, the undercoating composition according to the second aspect of the invention is described.

The undercoating composition of the invention essentially contains the reaction product of a hydroxyl group-containing benzophenone compound with a silane compound and/or a (partial) hydrolyzate thereof. Specifically the reaction product is obtained by reacting hydroxyl groups on the benzophenone compound with the silane compound. It is the same as the above-described component (1) in the protective coating composition.

In one preferred embodiment, the undercoating composition contains (1) the reaction product of a hydroxyl group-containing benzophenone compound with a silane compound and/or the (partial) hydrolyzate thereof set forth just above, and (5) an organic copolymer comprising an alkoxysilyl group-containing acrylic and/or vinyl monomer and another monomer copolymerizable therewith. Owing to the alkoxysilyl groups introduced, the undercoating composition is endowed with reactivity with the protective coating layer overlying the undercoat layer and improved in adhesion. Crosslinking of alkoxysilyl groups together improves heat resistance and imparts durability. Additionally, the copolymer is well compatible with the reaction product, i.e., silyl-modified benzophenone compound.

If the content of the alkoxysilyl group-containing monomer is less than 0.1% by weight, heat resistance and durability are not improved, and compatibility with the reaction product or silyl-modified benzophenone compound is aggravated. If the content of the alkoxysilyl group-containing monomer is more than 50% by weight, the copolymer would become too hard, losing adhesion. Therefore, the content of the alkoxysilyl group-containing acrylic and/or vinyl monomer is 0.1 to 50% by weight, preferably 2 to 30% by weight while the content of the copolymerizable monomer is 99.9 to 50%, preferably 98 to 70% by weight. The alkoxy moiety of the alkoxysilyl group should preferably have 1 to 4 carbon atoms, especially 1 to 3 carbon atoms.

Examples of the alkoxysilyl group-containing acrylic monomer include 3-methacryloxypropyltrimethoxysilane, 3-methacryloxypropyltriethoxysilane, 3-methacryloxypropylmethyldimethoxysilane, 3-methacryloxypropylmethyldiethoxysilane, 3-acryloxypropyltrimethoxysilane, 3-acryloxypropyltriethoxysilane, 3-acryloxypropylmethyldimethoxysilane, 3-acryloxypropylmethyldiethoxysilane, 3-methacryloxymethyltrimethoxysilane, 3-methacryloxymethyltriethoxysilane, 3-methacryloxymethylmethyldimethoxysilane, 3-methacryloxymethylmethyldiethoxysilane, 3-acryloxymethyltrimethoxysilane, 3-acryloxymethyltriethoxysilane, 3-acryloxymethylmethyldimethoxysilane, and 3-acryloxymethylmethyldiethoxysilane. Of these, 3-methacryloxypropyltrimethoxysilane and 3-methacryloxypropylmethyldimethoxysilane are preferred for ease of handling, crosslinked density and reactivity.

Examples of the alkoxysilyl group-containing vinyl monomer include vinyltrimethoxysilane, vinyltriethoxysilane, vinyltris(2-methoxyethoxy)silane, vinylmethyldimethoxysilane, vinylmethyldiethoxysilane, vinylmethylbis(2-methoxyethoxy)silane, 3-vinyloxypropyltrimethoxysilane, 3-vinyloxypropyltriethoxysilane, 3-vinyloxypropylmethyldimethoxysilane, and 3-vinyloxypropylmethyldiethoxysilane. Of these, vinyltrimethoxysilane, vinyltriethoxysilane, and 3-vinyloxypropyltrimethoxysilane are preferred for ease of handling and reactivity.

Examples of the other monomer copolymerizable with the alkoxysilane monomer include alkyl methacrylates such as methyl methacrylate, butyl methacrylate, and 2-ethylhexyl methacrylate; alkyl acrylates such as methyl acrylate, ethyl acrylate, and butyl acrylate; vinyl ethers such as glycidyl methacrylate, acrylamide, acrylonitrile, vinyl acetate, ethyl vinyl ether, butyl vinyl ether, and hexyl vinyl ether; styrene and ethylene glycol dimethacrylate; and methacrylic group-containing benzotriazoles serving as a UV absorber such as 2-(2'-hydroxy-5'-methacryloxyethylphenyl)-2H-benzotriazole. Since compounds having a group capable of reacting with the alkoxysilyl group, for example, 2-hydroxyethyl methacrylate can cause the undercoating composition to change with time, typically thickening or gelling, it is recommended to use a monomer free of a group capable of reacting with the alkoxysilyl group.

The organic copolymer constituting the main component of the undercoating composition according to the invention is a copolymer of the alkoxysilyl group-containing monomer with the other monomer copolymerizable therewith. The copolymer is readily obtained by adding a radical polymerization initiator to a solution of the monomers, followed by heating to effect reaction. The initiator is selected from peroxides such as dicumyl peroxide and benzoyl peroxide and azo compounds such as azobisisobutyronitrile.

If the organic copolymer is less than 10% by weight of the undercoating composition, the composition may become thermoplastic and less resistant to heat. If the organic copolymer exceeds 80% by weight of the undercoating composition, adhesion may become poor. Therefore, an appropriate amount of the organic copolymer is 10 to 80%, especially 20 to 80% by weight of the undercoating composition.

The organic copolymer (5) and the reaction product (1) are blended such that 0.1 to 50 parts, especially 2 to 50 parts by weight of the reaction product (1) is available per 100 parts by weight of the organic copolymer (5). More than 50 parts of the reaction product (1) is uneconomical whereas less than 0.1 part of the reaction product (1) fails to provide the desired weather resistance.

If the undercoating composition has a too low viscosity to apply and thus forms only a thin coating, an acrylic polymer may be added as a component capable of imparting flexibility without detracting from adhesion.

Such useful acrylic polymers include poly(alkyl methacrylates) and poly(alkyl acrylates) such as poly (methyl methacrylate), poly(butyl methacrylate), and poly (butyl acrylate), and copolymers thereof. These acrylic polymers are effective for imparting flexibility to the undercoating composition without detracting from adhesion. The amount of the acrylic polymer added is desirably limited to 30% by weight or less based on the entire undercoating composition since more than 30% by weight of the acrylic polymer can preclude the composition from heat curing.

In the undercoating composition, (6) a compound containing a nitrogen atom and an alkoxysilyl group in a molecule may be added for the purposes of assisting the composition in forming a satisfactory bond having water resistance, and fixing within the coating the silyl-modified benzophenone compound in component (1), the organic copolymer (5) and optional light stabilizer by crosslinking with alkoxysilyl groups therein. Preferably the compound (6) contains at least one nitrogen atom and at least two alkoxysilyl groups in a molecule.

For the purpose of causing the coating to be densely crosslinked through Michael addition reaction between (meth)acrylic groups in the organic copolymer and amino groups, the preferred compound (6) is one obtained by reacting an amino group-containing alkoxysilane, amide group-containing alkoxysilane or amino group-containing alkoxysilane with an epoxy group-containing alkoxysilane and a silylating agent and converting the reaction product into an amide. The more preferred compound is one obtained by reacting an amino group-containing alkoxysilane with an epoxy group-containing alkoxysilane and a silylating agent and amidating the reaction product.

Illustrative examples of the components used herein are described. Examples of the amino group-containing alkoxysilane include 3-aminopropyltrimethoxysilane, 3-aminopropyltriethoxysilane, 3-aminopropylmethyldimethoxysilane, 3-aminopropylmethyldiethoxysilane, N-(2-aminoethyl)-3-aminopropyltrimethoxysilane, N-(2-aminoethyl)-3-aminopropyltriethoxysilane, N-(2-aminoethyl)-3-aminopropylmethyldimethoxysilane, N-(2-aminoethyl)-3-aminopropyl-methyldiethoxysilane, 3-(trimethoxysilylpropyl)-aminopropyltrimethoxysilane, 3-(triethoxysilylpropyl)-aminopropyltriethoxysilane, 2-(trimethoxysilylpropyl)-aminoethyl-3-aminopropyltrimethoxysilane, and 2-(triethoxysilylpropyl) aminoethyl-3-aminopropyltriethoxysilane.

Examples of the amide group-containing alkoxysilane include ureidopropyltrimethoxysilane, ureidopropyltriethoxysilane, ureidopropylmethyldimethoxysilane, and ureidopropylmethyldiethoxysilane.

The process of obtaining the amide compound by eacting an amino group-containing alkoxysilane with an epoxy group-containing alkoxysilane and a silylating agent and amidating the reaction product is described below. The amino group-containing alkoxysilane is as exemplified above although N-(2-aminoethyl)-3-aminopropyltrimethoxysilane and N-(2-aminoethyl)-3-aminopropylmethyldimethoxysilane are preferred for adhesion and operation. The epoxy group-containing alkoxysilane is exemplified by those of the above formula (B) although γ-glycidoxypropyltrimethoxysilane, γ-glycidoxypropylmethyldimethoxysilane, and β-(3,4-epoxycyclohexyl)ethylmethyldimethoxysilane are preferred for reactivity and operation. Examples of the silylating agent include hexamethyldisilazane, N,N'-bis(trimethylsilyl)-formamide and N,N'-bis(trimethylsilyl)urea. When the amino group-containing alkoxysilane reacts with an epoxy group-containing alkoxysilane, the silylating agent serves to protect the OH groups generated by the reaction for preventing reaction between OH groups and alkoxysilyl groups, thereby precluding a change with time of the reaction product.

Reaction of the amino group-containing alkoxysilane with the epoxy group-containing alkoxysilane and the silylating agent may be effected by adding dropwise the epoxy group-containing alkoxysilane to a mixture of the amino group-containing alkoxysilane and the silylating agent and heating the mixture for reaction. Alternatively, the amino group-containing alkoxysilane is reacted with the epoxy group-containing alkoxysilane, and the silylating agent is added to the reaction product for further reaction.

In this reaction, the amino group-containing alkoxysilane and the epoxy group-containing alkoxysilane are preferably used in such amounts that the molar ratio of epoxy groups to amino groups may range from 0.3/1 to 1.2/1. If the molar ratio of epoxy/amino is less than 0.3, only a less number of alkoxy groups per molecule participate in crosslinking, leading to short cure, and the entire molecule is not spread, leading to a weak surface bond. If the molar ratio of epoxy/amino is more than 1.2, amino (=N—H) groups which can be amidated during subsequent amidation step become few, exacerbating water-resistant bond.

The reaction product is then amidated. For amidation, the reaction product may be reacted with a carboxylic acid halide, acid anhydride or acid isopropenyl ester such as acetic chloride, acetic bromide, propionic chloride, acetic anhydride, isopropenyl acetate or benzoyl chloride.

In the undercoating composition, 0.1 to 50 parts, especially 0.5 to 20 parts by weight of the compound (6) is blended per 100 parts by weight of the organic copolymer (5). An excessive amount of the compound (6) results in an undercoat layer having a too high crosslink density, a high hardness, and rather poor adhesion.

In the undercoating composition, (7) a light stabilizer having at least one cyclic hindered amine structure in a molecule may be added for improving weather resistance. The light stabilizer used herein should preferably be fully soluble in the solvent of the undercoating composition, compatible with the organic copolymer, and low volatile. In the undercoating composition, 0.1 to 10 parts, especially 2.6 to 10 parts by weight of the light stabilizer (7) is blended per 100 parts by weight of the organic copolymer (5). More than 10 parts of the light stabilizer detracts from adhesion of a coating. The light stabilizers used herein are as previously exemplified.

In the undercoating composition, a conventional ultraviolet absorber which has not been silyl modified may be added insofar as no detrimental effect is exerted. Such UV absorbers are organic UV absorbers compatible with the organic copolymer. Derivatives of compounds having a hydroxybenzophenone, benzotriazole, cyanoacrylate or triazine main skeleton are especially preferred. Also acceptable are polymers such as vinyl polymers having such a UV absorber incorporated on a side chain. Illustrative examples are as previously exemplified.

On use, the undercoating composition is diluted with a solvent. Useful solvents include diacetone alcohol, propylene glycol monomethyl ether, ethylene glycol monomethyl ether, propylene glycol monoethyl ether, ethylene glycol monoethyl ether, isobutyl alcohol, isopropyl alcohol, n-butyl alcohol, n-propyl alcohol, acetone, methyl ethyl ketone, methyl isobutyl ketone, acetyl acetone, ethyl acetate, butyl acetate, xylene, and toluene. The undercoating composition is generally diluted with the solvent into a solution containing 5 to 10% by weight of the organic copolymer prior to use.

The undercoating composition is applied to a surface of a plastic substrate, typically a plastic film, which has been cleaned, whereupon the diluting solvent is evaporated off at room temperature or elevated temperature, leaving a dry undercoat of about 1 to 10 $\mu$m, preferably about 2 to 5 $\mu$m thick. The organic solvent dilution should preferably have a viscosity of about 5 to 30 centistokes. A dilution with a viscosity of less than 5 centistokes would be difficult to form a thick coat whereas a dilution with a viscosity of more than 30 centistokes would be difficult to handle and apply. To the composition, a fluorine or silicone surfactant may be added for leveling of the coating, and a crosslinking/curing catalyst may also be added for accelerating cure.

The cured coating of the undercoating composition is obtained by heating the wet coating at 80 to 200° C.

By covering plastic substrates such as plastic films and sheets with the cured coat of the undercoating composition, the substrates are improved in initial adhesion, heat resistance, hot-water resistance, and weather resistance. Advantageously, a topcoat is formed on the undercoat, using the protective coating composition of the first aspect or a conventional colloidal silica-containing organopolysiloxane composition.

The colloidal silica-containing organopolysiloxane composition used herein contains an organopolysiloxane and colloidal silica. The organopolysiloxane is a hydrolyzate or co-hydrolyzate of a silane compound of the following general formula (C'):

$$R^5{}_m SiR^2{}_n (OR^3)_{4-m-n} \quad\quad (C')$$

wherein $R^5$ is a $C_{1-10}$ alkyl group, aryl group, halogenated alkyl group, halogenated aryl group, alkenyl group or an organic group having an epoxy, (meth)acryloxy, mercapto, amino or cyano group, $R^2$ and $R^3$ are as defined above in formula (B), m and n each are equal to 0, 1 or 2, and m+n is equal to 0, 1 or 2. The colloidal silica is obtained by dispersing silica fines having a particle size of about 1 to 100 mμ in water or an alcohol such as methanol, ethanol, isobutanol or diacetone alcohol. To the hydrolyzate or co-hydrolyzate, 5 to 70% by weight of the colloidal silica is added.

In formula (C'), $R^5$ is a $C_{1-10}$ alkyl group, aryl group, halogenated alkyl group, halogenated aryl group, alkenyl group or an organic group having an epoxy, (meth)acryloxy, mercapto, amino or cyano group. Examples of the group represented by $R^5$ include alkyl groups such as methyl, ethyl, propyl, isopropyl, butyl, hexyl, decyl, and cyclohexyl; aryl groups such as phenyl and phenethyl; halogenated alkyl groups such as 3-chloropropyl, 3,3,3-trifluoropropyl, and 3,3,4,4,5,5,6,6-nonafluorohexyl; halogenated aryl groups such as p-chlorophenyl; alkenyl groups such as vinyl, allyl, 9-decenyl and p-vinylbenzyl; epoxy group-containing organic groups such as 3-glycidoxypropyl, β-(3,4-epoxycyclohexyl)ethyl, and 9,10-epoxydecyl; (meth)acryloxy group-containing organic groups such as γ-methacryloxypropyl and γ-acryloxypropyl; mercapto group-containing organic groups such as γ-mercaptopropyl and p-mercaptomethylphenylethyl; amino group-containing organic groups such as γ-aminopropyl and (β-aminoethyl)-γ-aminopropyl; and cyano group-containing organic groups such as β-cyanoethyl. $R^2$ and $R^3$ are as defined above in formula (B). The letters m and n each are equal to 0, 1 or 2, and m+n is equal to 0, 1 or 2.

Illustrative examples of the silane compound satisfying the above conditions include the exemplary compounds described in conjunction with the general formula (C) as well as γ-glycidoxypropyltrimethoxysilane, γ-glycidoxypropylmethyldimethoxysilane, γ-glycidoxypropyltriethoxysilane, γ-glycidoxypropylmethyldiethoxysilane, β-(3,4-epoxycyclohexyl)ethyltrimethoxysilane, β-(3,4-epoxycyclohexyl)ethylmethyldimethoxysilane, β-(3,4-epoxycyclohexyl)ethyltriethoxysilane, and β-(3,4-epoxycyclohexyl)ethylmethyldiethoxysilane. These silane compounds may be used alone or in admixture of two or more.

(Co)hydrolysis of the silane compound(s) is effected by adding water to a lower alcohol solution of the silane compound(s) in the presence of an acid catalyst. Exemplary lower alcohols are methanol, ethanol, isopropanol and butanol. Solvents compatible with these alcohols include ketones such as acetone and acetylacetone, esters such as ethyl acetate and isobutyl acetate, and ethers such as propylene glycol monomethyl ether, dipropylene glycol monomethyl ether, and diisopropyl ether.

The (co)hydrolyzate or organopolysiloxane should preferably have a number average molecular weight of about 300 to 10,000, especially about 500 to 2,000.

In the organopolysiloxane composition, any of well-known additives commonly used in conventional coating compositions are blended if necessary.

For example, there may be added an effective amount of a microparticulate inorganic oxide capable of absorbing detrimental light rays with a wavelength of up to 400 nm which can cause decomposition and degradation of organic compounds, which has been described as an inorganic UV absorber or component (3) in conjunction with the protective coating composition of the first aspect of the invention.

Also, a catalytic amount of a curing catalyst as previously described is preferably added. An appropriate amount of the curing catalyst used is 0.01 to 1 part, especially 0.02 to 0.4 part by weight per 100 parts by weight as solids of the organopolysiloxane composition.

The organopolysiloxane composition is applied onto the undercoat of the undercoating composition on a plastic substrate and cured by heating, typically at a temperature of 50 to 140° C. In this way, a top coat is formed on the plastic substrate to a high bond strength. The top coat of organopolysiloxane synergistically cooperates with the undercoat of the undercoating composition to accomplish high adhesion and abrasion resistance as well as excellent weather resistance and its stability due to tight fixation of the UV absorber in the undercoat. The top coat generally has a thickness of about 1 to 10 μm though not critical.

The undercoating composition of the invention is applicable to various plastic materials including polycarbonate, polystyrene, modified acrylic resins, urethane resins, thiourethane resins, polycondensates of halogenated bisphenol A and ethylene glycol, acrylic urethane resins, halogenated aryl group-containing acrylic resins, and sulfur-containing resins. Outstanding benefits are obtained when the undercoating composition is applied to transparent polycarbonate resins.

EXAMPLE

Examples of the invention are given below by way of illustration and not by way of limitation. All parts and percents are by weight. The viscosity is at 25° C. Synthesis Examples are first described.

Synthesis of Silyl-modified UV Absorbers

Synthesis Example 1

A 0.2-liter flask equipped with a stirrer, condenser and thermometer was charged with 50 g (0.20 mol) of 2,2',4,4'-tetrahydroxybenzophenone, 47.2 g (0.20 mol) of γ-glycidoxypropyltrimethoxysilane, 0.81 g (0.0036 mol) of benzyltriethylammonium chloride, and 100 g of butyl acetate, which were stirred and heated at 60° C. for dissolution. At this point, the solution was yellow and clear. The solution was heated to 120° C., at which temperature reaction was effected for 4 hours, obtaining a brown clear solution. By gas chromatography analysis, the disappearance of the reactant, γ-glycidoxypropyltrimethoxysilane was confirmed. The solid concentration was 50.1%. A dilution obtained by diluting the solution with ethanol to a solid concentration of 0.05 g/liter was analyzed for absorbance by spectrophotometry, finding an absorbance: λmax 349.9 nm and Abs 2.82, which was substantially identical with the absorbance of the reactant, 2,2',4,4'-tetrahydroxybenzophenone as analyzed at the same concentration: λmax 351.7 nm and Abs 3.01, with the light absorption waveform of the former being also substantially identical with the latter.

Synthesis Example 2

A 0.2-liter flask equipped with a stirrer, condenser and thermometer was charged with 50 g (0.20 mol) of 2,2',4,4'- tetrahydroxybenzophenone, 47.2 g (0.20 mol) of γ-glycidoxypropyltrimethoxysilane, 1 g (0.0092 mol) of tetramethylammonium chloride, and 100 g of butyl acetate, which were stirred and heated at 60° C. for dissolution. At this point, the solution was yellow and clear. The solution was heated to 120° C., at which temperature reaction was effected for 4 hours, obtaining a brown clear solution. By gas chromatography analysis, the disappearance of the reactant, γ-glycidoxypropyltrimethoxysilane was confirmed. The solid concentration was 49.9%. A dilution obtained by diluting the solution with ethanol to a solid concentration of 0.05 g/liter was analyzed for absorbance by spectrophotometry, finding an absorbance: λmax 349.8 nm and Abs 2.86, which was substantially identical with the absorbance of the reactant, 2,2',4,4'-tetrahydroxybenzophenone as analyzed at the same concentration: λmax 351.7 nm and Abs 3.01, with the light absorption waveform of the former being also substantially identical with the latter.

Synthesis Example 3

A 0.2-liter flask equipped with a stirrer, condenser and thermometer was charged with 50 g (0.20 mol) of 2,2',4,4'-tetrahydroxybenzophenone, 49.3 g (0.20 mol) of β-(3,4-epoxycyclohexyl)ethyltrimethoxysilane, 0.81 g (0.0036 mol) of benzyltriethylammonium chloride, and 100 g of butyl acetate, which were stirred and heated at 60° C. for dissolution. At this point, the solution was yellow and clear. The solution was heated to 120° C., at which temperature reaction was effected for 4 hours, obtaining a brown clear solution. By gas chromatography analysis, the disappearance of the reactant, γ-glycidoxypropyltrimethoxysilane was confirmed. The solid concentration was 51.0%. A dilution obtained by diluting the solution with ethanol to a solid concentration of 0.05 g/liter was analyzed for absorbance by spectrophotometry, finding an absorbance: λmax 350.9 nm and Abs 2.88, which was substantially identical with the absorbance of the reactant, 2,2',4,4'-tetrahydroxybenzophenone as analyzed at the same concentration: λmax 351.7 nm and Abs 3.01, with the light absorption waveform of the former being also substantially identical with the latter.

Synthesis Example 4

A 0.2-liter flask equipped with a stirrer, condenser and thermometer was charged with 50 g (0.20 mol) of 2,2',4,4'-tetrahydroxybenzophenone, 94.4 g (0.40 mol) of γ-glycidoxypropyltrimethoxysilane, 1.62 g (0.0072 mol) of benzyltriethylammonium chloride, and 150 g of butyl acetate, which were stirred and heated at 60° C. for dissolution. At this point, the solution was yellow and clear. The solution was heated to 120° C., at which temperature reaction was effected for 4 hours, obtaining a brown clear solution. By gas chromatography analysis, the disappearance of the reactant, γ-glycidoxypropyltrimethoxysilane was confirmed. The solid concentration was 50.3%. A dilution obtained by diluting the solution with ethanol to a solid concentration of 0.05 g/liter was analyzed for absorbance by spectrophotometry, finding an absorbance: λmax 348.9 nm and Abs 2.79, which was substantially identical with the absorbance of the reactant, 2,2',4,4'-tetrahydroxybenzophenone as analyzed at the same concentration: λmax 351.7 nm and Abs 3.01, with the light absorption waveform of the former being also substantially identical with the latter.

Synthesis Example 5

A 0.2-liter flask equipped with a stirrer, condenser and thermometer was charged with 50 g (0.20 mol) of 2,2',4,4'-tetrahydroxybenzophenone, 49.6 g (0.20 mol) of γ-glycidoxypropylmethyldiethoxysilane, 0.81 g (0.0036 mol) of benzyltriethylammonium chloride, and 100 g of butyl acetate, which were stirred and heated at 60° C. for dissolution. At this point, the solution was yellow and clear. The solution was heated to 120° C., at which temperature reaction was effected for 4 hours, obtaining a brown clear solution. By gas chromatography analysis, the disappearance of the reactant, γ-glycidoxypropylmethyldiethoxysilane was confirmed. The solid concentration was 50.0%. A dilution obtained by diluting the solution with ethanol to a solid concentration of 0.05 g/liter was analyzed for absorbance by spectrophotometry, finding an absorbance: λmax 350.9 nm and Abs 2.88, which was substantially identical with the absorbance of the reactant, 2,2',4 ,4'-tetrahydroxybenzophenone as analyzed at the same concentration: λmax 351.7 nm and Abs 3.01, with the light absorption waveform of the former being also substantially identical with the latter.

Synthesis Example 6

A 0.2-liter flask equipped with a stirrer, condenser and thermometer was charged with 42.4 g (0.20 mol) of 2,4-dihydroxybenzophenone, 47.2 g (0.20 mol) of γ-glycidoxypropyltrimethoxysilane, 0.81 g (0.0036 mol) of benzyltriethylammonium chloride, and 90 g of butyl acetate, which were stirred and heated at 60° C. for dissolution. At this point, the solution was yellow and clear. The solution was heated to 120° C., at which temperature reaction was effected for 4 hours, obtaining a yellowish brown clear solution. By gas chromatography analysis, the disappearance of the reactant, γ-glycidoxypropyltrimethoxysilane was confirmed. The solid concentration was 49.7%. A dilution obtained by diluting the solution with ethanol to a solid concentration of 0.05 g/liter was analyzed for absorbance by spectrophotometry, finding an absorbance: λmax 272.9 nm and Abs 1.52, which was slightly shifted to a shorter wavelength as compared with the absorbance of the reactant, 2,4-dihydroxybenzophenone as analyzed at the same concentration: λmax 289.1 nm and Abs 2.61, with the intensity being also lightly lowered.

Synthesis of Alkoxysilyl-containing Organic Copolymers

Synthesis Example 7

A 0.5-liter flask equipped with a stirrer, condenser and thermometer was charged with 20 g of γ-methacryloxypropyltrimethoxysilane, 60 g of methyl methacrylate, 5 g of ethyl acrylate, 5 g of vinyl acetate, 10 g of glycidyl methacrylate, 0.2 g of ethylene glycol dimethacrylate, 0.5 g of azobisisobutyronitrile as a polymerization initiator, and 20 g of diacetone alcohol and 80 g of ethylene glycol monomethyl ether as solvents. The contents were stirred for 5 hours at 80 to 90° C. under a nitrogen stream. The resulting solution containing an organic copolymer having alkoxysilyl groups had a viscosity of 43,600 centistokes, and the copolymer contained 20% of γ-methacryloxypropyltrimethoxysilane.

Synthesis Example 8

The procedure of Synthesis Example 7 was repeated except that the amount of γ-methacryloxypropyltrimethoxysilane was changed to 10 g and the amount of methyl methacrylate was changed to 70 g, obtaining a solution containing an organic copolymer having alkoxysilyl groups. The organic copolymer solution had a viscosity of 40,600 centistokes, and the copolymer contained 10% of γ-methacryloxypropyltrimethoxysilane.

Synthesis Example 9

The procedure of Synthesis Example 7 was repeated except that 20 of γ-methacryloxypropyltrimethoxysilane was replaced by 20 g of vinyltrimethoxysilane, obtaining a solution containing an organic copolymer having alkoxysilyl groups. The organic copolymer solution had a viscosity of 39,700 centistokes, and the copolymer contained 20% of vinyltrimethoxysilane.

Synthesis of Compounds Containing a Nitrogen Atom and an Alkoxysilyl Group in a Molecule Synthesis Example 10

A 2.0-liter flask equipped with a stirrer, condenser and thermometer was charged with 222 g of N-2-(aminoethyl)-3-aminopropyltrimethoxysilane and 242 g of hexamethyldisilazane as a silylating agent. The contents were heated at 120° C. under a nitrogen stream. To the flask, 496 g of γ-glycidoxypropylmethyldiethoxysilane was added dropwise for reaction. The reaction mixture was further stirred and heated at 120° C. for 5 hours. A low-boiling fraction was stripped off at 100° C. under vacuum, leaving 862 g of a viscous compound having a viscosity of 1,387 centistokes, a refractive index of 1.4618 and a specific gravity of 1.048.

Next, a 2.0-liter flask equipped with a stirrer, condenser and thermometer was charged with 862 g of the reaction product and 862 g of toluene. In a nitrogen stream, 141 g of acetic anhydride was added dropwise to the flask at room temperature for reaction. The reaction mixture was further stirred and heated at 110° C. for 2 hours. Methanol, 141 g, was added dropwise to the reaction mixture at 50° C., which was further stirred and heated at 50° C. for 1 hour. A low-boiling fraction was stripped off at 100° C. under vacuum, leaving a highly viscous compound.

This compound was analyzed by IR absorption spectroscopy, finding no absorption peaks attributable to the OH or NH group in the region of at least 3,000 cm$^{-1}$, but a definite peak attributable to the amide group absorption at 1,650 cm$^{-1}$.

Synthesis of Colloidal Silica-containing Organopolysiloxane Composition

Synthesis Example 11

A 1.0-liter flask equipped with a stirrer, condenser and thermometer was charged with 164 g of methyltriethoxysilane and 46 g of isobutanol, which were maintained below 5° C. under ice cooling with stirring. To this was added 138 g of colloidal silica (containing 20% of $SiO_2$) below 5° C. The mixture was stirred for 2 hours under ice cooling and for a further 8 hours at 20 to 25° C. Thereafter, 45 g of diacetone alcohol and 50 g of isobutanol were added, 1.5 g of a 10% aqueous solution of sodium propionate was then added, and the resulting mixture was adjusted to pH 6 to 7 with acetic acid. This was adjusted with isobutanol to a nonvolatile content of 17% as measured by JIS K-6833 and ripened for 5 days at room temperature. The resulting colloidal silica-containing organopolysiloxane composition had a viscosity of about 5 centistokes and the nonvolatile component had a number average molecular weight of about 1,000.

Synthesis Example 12

The procedure of Synthesis Example 11 was repeated except that 3.0 g of a 10% aqueous solution of tetramethylammonium benzoate was used instead of the sodium propionate aqueous solution, obtaining a colloidal silica-containing organopolysiloxane composition.

Synthesis Example 13

The procedure of Synthesis Example 11 was repeated except that there was further added 1.8 g of 2,2',4,4'-tetrahydroxybenzophenone (corresponding to 2 parts per 100 parts of the solids of the colloidal silica-containing organopolysiloxane composition), obtaining a colloidal silica-containing organopolysiloxane composition.

Synthesis of Silyl-modified Light Stabilizer

Synthesis Example 14

A 0.3-liter flask equipped with a stirrer, condenser and thermometer was charged with 100 g (0.5 mol) of 2,2,6,6-tetramethyl-4-allyl-piperidine and 0.13 g of a butanol solution of chloroplatinic acid (2% solution of $H_2PtCl_6 \cdot 6H_2O$). To the flask at room temperature, 80.6 g (0.66 mol) of trimethoxysilane was added dropwise over one hour, and reaction effected at 90° C. for 5 hours.

At the end of reaction, distillation was effected under vacuum, collecting 126 g of a fraction at 151–154° C. at 7 mmHg. By gas chromatography, 2,2,6,6-tetramethyl-piperidino-4-propyltrimethoxysilane was collected at a purity of 97%. Its structure was confirmed by IR spectrometry and proton-NMR analysis.

Now, Examples of the invention in the first aspect are given together with Comparative Examples. The abbreviations for UV absorbers, microparticulate inorganic oxides, and hindered amine light stabilizers used herein have the following meaning.

UV Absorbers

UVA-1: reaction product of Synthesis Example 1
UVA-2: reaction product of Synthesis Example 2
UVA-3: reaction product of Synthesis Example 3
UVA-4: reaction product of Synthesis Example 4
UVA-5: reaction product of Synthesis Example 5
UVA-6: reaction product of Synthesis Example 6
UVA-7: 2,2',4,4'-tetrahydroxybenzophenone
UVA-8: 2,4-dihydroxybenzophenone
UVA-9: 2-(3,5-di-t-butyl-2-hydroxyphenyl)-5-chlorobenzo-triazole
UVA-10: 2-(2-hydroxy-4-hexyloxyphenyl)-4,6-diphenyltriazine
UVA-11: a copolymer of 2-(2'-hydroxy-5'-methacryloxyethyl-phenyl)-2H-benzotriazole (30%) and methyl methacrylate (70%)
UVA-12: a copolymer of 2-(2'-hydroxy-5'-methacryloxyethylphenyl)-2H-benzotriazole (30%) and styrene (70%)

Microparticulate Inorganic Oxides

UV-1: titanium oxide sol (20% methanol dispersion of $TiO_2$ with a mean particle size of 20 mμ)
UV-2: surface treated titanium oxide sol (20% methanol dispersion of titania particles surface coated with $SiO_2$, containing 85% $TiO_2$, and having a mean particle size of 20 mμ)
UV-3: microparticulate compound oxide sol (20% methanol dispersion of mixed compound titanium oxide having an average composition: $TiO_2/ZrO_2/SiO_2$ =70/8/22 and having a mean particle size of 20 mμ)
UV-4: cerium oxide sol (20% methanol dispersion of $CeO_2$ with a mean particle size of 20 mμ)

UV-5: surface treated zinc oxide sol (20% methanol dispersion of zinc oxide particles surface treated with 15% silica and having a mean particle size of 20 mμ)

UV-6: silica sol (20% methanol dispersion of $SiO_2$ with a mean particle size of 20 mμ)

Hindered Amine Light Stabilizers

HALS-1: N-acetyl-3-dodecyl-1-(2,2,6,6-tetramethyl-4-piperidinyl)pyrrolidine-2,5-dione HALS-2: a condensate of 1,2,3,4-butanetetracarboxylic acid, 2,2,6,6-tetramethyl-piperidinol and tridecanol HALS-3: 2,2,6,6-tetramethylpiperidino-4-propyltrimethoxysilane synthesized in Synthesis Example 14

In Examples, physical properties were measured and rated by the following procedures.

(1) Weathering Test

An accelerated weathering test was carried out by a sunshine carbon arc weatherometer according to JIS K-5400. After 5,000 hours, a yellowing factor and adhesion were examined. Those samples having a yellowing factor of up to 7 and good adhesion were rated "Passed."

(2) Marring Test

Using a Taber abrader equipped with an abrasive wheel CS-10F, a sample was rotated under a load of 500 g according to ASTM 1044. After 1,000 revolutions, the sample was measured for haze. A Taber abrasion (%) was calculated as the haze after test minus the haze prior to test.

(3) Adhesion of Cured Film

An adhesive tape test was carried out according to JIS K-5400 by scribing a sample with a razor along spaced 1-mm apart orthogonal lines to define 100 square sections in the coating, closely applying a commercially available adhesive tape thereto, and quickly peeling the adhesive tape by an angle of 90 degrees. The number (X) of remaining (not peeled) coating sections is expressed as X/100.

Example 1

(a) Preparation of Primer

A 0.5-liter flask equipped with a stirrer, condenser and thermometer was charged with 20 g of γ-methacryloxypropyltrimethoxysilane, 60 g of methyl methacrylate, 5 g of ethyl acrylate, 5 g of vinyl acetate, 10 g of glycidyl methacrylate, 0.2 g of ethylene glycol dimethacrylate, 0.5 g of azobisisobutyronitrile as a polymerization initiator, and 20 g of diacetone alcohol and 80 g of ethylene glycol monomethyl ether as solvents. The contents were stirred for 5 hours at 80 to 90° C. under a nitrogen stream. The resulting solution of thermosetting acrylic resin had a viscosity of 43,600 centistokes, and the copolymer contained 40% of alkoxyl group. The resin solution was diluted with a 20/80 mixture of diacetone alcohol and ethylene glycol monomethyl ether so as to give a nonvolatile concentration of 10% as measured according to JIS K-6833. The thus prepared primer had a viscosity of 20 to 40 centistokes. UVA-7 was added to the primer in an amount of 6 parts per 100 parts of solids in the primer and fully dissolved therein, completing the primer.

(b) Preparation of Protective Coating Composition

A 1.0-liter flask equipped with a stirrer, condenser and thermometer was charged with 164 g of methyltriethoxysilane and 46 g of isobutanol, which were maintained below 5° C. under ice cooling while stirring. To the flask, 138 g of water-dispersed colloidal silica (containing 20% of $SiO_2$) below 5° C. was added. The contents were stirred for 2 hours under ice cooling and for 8 hours at 20 to 25° C., following which 45 g of diacetone alcohol and 50 g of isobutanol were added. Thereafter, 1.5 g of a 10% aqueous solution of sodium propionate was added to the reaction solution, which was adjusted to pH 6 to 7 with acetic acid. This was diluted with isobutanol so as to give a nonvolatile concentration of 17% as measured according to JIS K-6833. Ripening for 5 days at room temperature yielded a silane hydrolyzate solution having a viscosity of about 5 centistokes and the nonvolatile matter had a number average molecular weight of about 1,000. The UV absorbers UVA-1 and UV-1 were added to the silane hydrolyzate solution in amounts of 10 parts as solids of UVA-1 and 20 parts as solids of UV-1 per 100 parts of solids in the solution and fully dissolved therein, obtaining a protective coating composition.

(c) Preparation of Surface-coated Part

The primer was applied onto a polycarbonate resin sheet of 0.5 mm thick by the flow coating method and cured at about 120° C. for about 30 minutes, obtaining a cured primer coating of 2 to 5 μm thick. The protective coating composition was applied onto the primer coating by the flow coating method and cured at about 120° C. for about one hour, obtaining a cured protective coating of 2 to 5 μm. The thus surface-coated sheet was examined for physical properties, with the results shown in Table 3.

Example 2

(a) Preparation of Primer

A primer was prepared by the same procedure as Example 1 except that 20 g of γ-methacryloxypropyltrimethoxysilane was as changed to 10 g and 60 g of methyl methacrylate was changed to 70 g.

(b) Preparation of Protective Coating Composition

A protective coating composition was prepared by the same procedure as Example 1 except that 3.0 g of a 10% aqueous solution of tetramethylammonium benzoate was used instead of 1.5 g of the 10% aqueous solution of sodium propionate.

(c) Preparation of surface-coated part

The primer and the protective coating composition, both prepared above, were sequentially applied and cured by the same procedure as in Example 1, obtaining a sheet surface coated with cured coatings. The thus surface-coated sheet was examined for physical properties, with the results shown in Table 3.

Example 3

(a) Preparation of Primer A Primer was Prepared as in Example 1.

(b) Preparation of Protective Coating Composition

A 1.0-liter flask equipped with a stirrer, condenser and thermometer was charged with 164 g of methyltriethoxysilane, 19.7 g of UVA-1 and 46 g of isobutanol, which were maintained below 5° C. under ice cooling while stirring. To the flask, 138 g of water-dispersed colloidal silica (containing 20% of $SiO_2$) below 5° C. was added. The contents were stirred for 2 hours under ice cooling and for 8 hours at 20 to 25° C., following which 45 g of diacetone alcohol and 50 g of isobutanol were added. Thereafter, 1.5 g of a 10% aqueous solution of sodium propionate was added to the reaction solution, which was adjusted to pH 6 to 7 with acetic acid. This was diluted with isobutanol so as to give a nonvolatile concentration of 19% as measured according to JIS K-6833. Ripening for 5 days at room temperature yielded a silane hydrolyzate solution having a viscosity of about 5 centistokes and the nonvolatile matter had a number average molecular weight of about 1,000. The UV absorber UV-1 was added to the silane hydrolyzate solution in amounts of 20 parts as solids of UV-1 per 100 parts of solids in the solution and fully dissolved therein, obtaining a protective coating composition.

(c) Preparation of Surface-coated Part

The primer and the protective coating composition, both prepared above, were sequentially applied and cured by the same procedure as in Example 1, obtaining a sheet surface coated with cured coatings. The thus surface-coated sheet was examined for physical properties, with the results shown in Table 3.

Example 4

(a) Preparation of Primer A Primer was Prepared as in Example 1.

(b) Preparation of Protective Coating Composition

A 1.0-liter flask equipped with a stirrer, condenser and thermometer was charged with 164 g of methyltriethoxysilane, 19.7 g of UVA-3 and 46 g of isobutanol, which were maintained below 5° C. under ice cooling while stirring. To the flask, 138 g of water-dispersed colloidal silica (containing 20% of $SiO_2$) below 5° C. was added. The contents were stirred for 2 hours under ice cooling and for 8 hours at 20 to 25° C., following which 45 g of diacetone alcohol and 50 g of isobutanol were added. Thereafter, 1.5 g of a 10% aqueous solution of sodium propionate was added to the reaction solution, which was adjusted to pH 6 to 7 with acetic acid. This was diluted with isobutanol so as to give a nonvolatile concentration of 19% as measured according to JIS K-6833. Ripening for 5 days at room temperature yielded a silane hydrolyzate solution having a viscosity of about 5 centistokes and the nonvolatile matter had a number average molecular weight of about 1,000. The UV absorber UV-1 was added to the silane hydrolyzate solution in amounts of 20 parts as solids of UV-1 per 100 parts of solids in the solution and fully dissolved therein, obtaining a protective coating composition.

(c) Preparation of Surface-coated Part

The primer and the protective coating composition, both prepared above, were sequentially applied and cured by the same procedure as in Example 1, obtaining a sheet surface coated with cured coatings. The thus surface-coated sheet was examined for physical properties, with the results shown in Table 3.

Example 5

(a) Preparation of Primer

A Primer was Prepared as in Example 1.

(b) Preparation of Protective Coating Composition

A 1.0-liter flask equipped with a stirrer, condenser and thermometer was charged with 164 g of methyltriethoxysilane, 19.7 g of UV-5 and 46 g of isobutanol, which were maintained below 5° C. under ice cooling while stirring. To the flask, 138 g of water-dispersed colloidal silica (containing 20% of $SiO_2$) below 5° C. was added. The contents were stirred for 2 hours under ice cooling and for 8 hours at 20 to 25° C., following which 45 g of diacetone alcohol and 50 g of isobutanol were added. Thereafter, 1.5 g of a 10% aqueous solution of sodium propionate was added to the reaction solution, which was adjusted to pH 6 to 7 with acetic acid. This was diluted with isobutanol so as to give a nonvolatile concentration of 19% as measured according to JIS K-6833. Ripening for 5 days at room temperature yielded a silane hydrolyzate solution having a viscosity of about 5 centistokes and the nonvolatile matter had a number average molecular weight of about 1,000. The UV absorber UV-1 was added to the silane hydrolyzate solution in amounts of 20 parts as solids of UV-1 per 100 parts of solids in the solution and fully dissolved therein, obtaining a protective coating composition.

(c) Preparation of Surface-coated Part

The primer and the protective coating composition, both prepared above, were sequentially applied and cured by the same procedure as in Example 1, obtaining a sheet surface coated with cured coatings. The thus surface-coated sheet was examined for physical properties, with the results shown in Table 3.

Example 6

(a) Preparation of Primer A Primer was Prepared as in Example 1.

(b) Preparation of Protective Coating Composition

A 1.0-liter flask equipped with a stirrer, condenser and thermometer was charged with 164 g of methyltriethoxysilane, 19.7 g of UVA-6 and 46 g of isobutanol, which were maintained below 50° C. under ice cooling while stirring. To the flask, 138 g of water-dispersed colloidal silica (containing 20% of $SiO_2$) below 5° C. was added. The contents were stirred for 2 hours under ice cooling and for 8 hours at 20 to 25° C., following which 45 g of diacetone alcohol and 50 g of isobutanol were added. Thereafter, 1.5 g of a 10% aqueous solution of sodium propionate was added to the reaction solution, which was adjusted to pH 6 to 7 with acetic acid. This was diluted with isobutanol so as to give a nonvolatile concentration of 19% as measured according to JIS K-6833. Ripening for 5 days at room temperature yielded a silane hydrolyzate solution having a viscosity of about 5 centistokes and the nonvolatile matter had a number average molecular weight of about 1,000. The UV absorber UV-1 was added to the silane hydrolyzate solution in amounts of 20 parts as solids of UV-1 per 100 parts of solids in the solution and fully dissolved therein, obtaining a protective coating composition.

(c) Preparation of Surface-coated Part

The primer and the protective coating composition, both prepared above, were sequentially applied and cured by the same procedure as in Example 1, obtaining a sheet surface coated with cured coatings. The thus surface-coated sheet was examined for physical properties, with the results shown in Table 3.

Examples 7–39 and Comparative Examples 1–8

Primers and protective coating compositions were prepared according to the composition shown in Tables 1 and 2 by the same procedure as in Example 1

They were similarly applied and cured onto polycarbonate resin sheets of 0.5 mm thick, obtaining sheets surface coated with cured coatings. The thus surface-coated sheets were examined for physical properties, with the results shown in Tables 3 and 4.

TABLE 1

| | Protective coating composition (parts) | | Primer (parts) | |
|---|---|---|---|---|
| | UVA | UV | UVA | HALS |
| Example 1 | UVA-1 (10) | UV-1 (20) | UVA-7 (6) | — |
| Example 2 | UVA-1 (10) | UV-1 (20) | UVA-7 (6) | — |
| Example 3 | (incorporated in silane compound) UVA-1 (19.7 g) | UV-1 (20) | UVA-7 (6) | — |
| Example 4 | (incorporated in silane compound) UVA-3 (19.7 g) | UV-1 (20) | UVA-7 (6) | — |
| Example 5 | (incorporated in silane compound) UVA-5 (19.7 g) | UV-1 (20) | UVA-7 (6) | — |
| Example 6 | (incorporated in silane compound) UVA-6 (19.7 g) | UV-1 (20) | UVA-7 (6) | — |
| Example 7 | UVA-2 (10) | UV-1 (20) | UVA-7 (6) | — |
| Example 8 | UVA-3 (10) | UV-1 (20) | UVA-7 (6) | — |
| Example 9 | UVA-4 (10) | UV-1 (20) | UVA-7 (6) | — |
| Example 10 | UVA-5 (10) | UV-1 (20) | UVA-7 (6) | — |
| Example 11 | UVA-6 (10) | UV-1 (20) | UVA-7 (6) | — |
| Example 12 | UVA-1 (20) | UV-1 (20) | UVA-7 (6) | — |
| Example 13 | UVA-1 (10) | UV-1 (30) | UVA-7 (6) | — |
| Example 14 | UVA-1 (30) | UV-1 (20) | UVA-7 (6) | — |
| Example 15 | UVA-1 (10) | UV-1 (50) | UVA-7 (6) | — |
| Example 16 | UVA-1 (6) | UV-1 (20) | UVA-7 (6) | — |
| Example 17 | UVA-1 (5) UVA-3 (5) | UV-1 (20) | UVA-7 (6) | — |
| Example 18 | UVA-1 (5) UVA-4 (5) | UV-1 (20) | UVA-7 (6) | — |
| Example 19 | UVA-1 (5) UVA-5 (5) | UV-1 (20) | UVA-7 (6) | — |
| Example 20 | UVA-1 (8) UVA-6 (2) | UV-1 (20) | UVA-7 (6) | — |
| Example 21 | UVA-1 (10) | UV-1 (20) | UVA-7 (6) | HALS-1 (0.05) |
| Example 22 | UVA-1 (10) | UV-2 (20) | UVA-7 (6) | HALS-1 (0.05) |
| Example 23 | UVA-1 (10) | UV-3 (20) | UVA-7 (6) | HALS-1 (0.05) |
| Example 24 | UVA-1 (10) | UV-4 (20) | UVA-7 (6) | HALS-1 (0.05) |
| Example 25 | UVA-1 (10) | UV-5 (20) | UVA-7 (6) | HALS-1 (0.05) |
| Example 26 | UVA-1 (10) | UV-2 (20) | UVA-1 (6) | HALS-1 (0.05) |
| Example 27 | UVA-1 (10) | UV-2 (20) | UVA-1 (1.5) UVA-7 (4.5) | HALS-1 (0.05) |
| Example 28 | UVA-1 (10) | UV-2 (20) | UVA-1 (3) UVA-7 (3) | HALS-1 (0.05) |
| Example 29 | UVA-1 (10) | UV-2 (20) | UVA-7 (6) | HALS-2 (0.05) |
| Example 30 | UVA-1 (10) | UV-1 (20) | UVA-8 (8) | — |
| Example 31 | UVA-1 (10) | UV-1 (20) | UVA-9 (8) | — |
| Example 32 | UVA-1 (10) | UV-1 (20) | UVA-10 (8) | — |
| Example 33 | UVA-1 (10) | UV-1 (20) | UVA-11 (8) | — |
| Example 34 | UVA-1 (10) | UV-1 (20) | UVA-12 (8) | — |
| Example 35 | UVA-1 (30) | — | UVA-1 (6) | HALS-1 (0.05) |
| Example 36 | UVA-3 (30) | — | UVA-1 (6) | HALS-2 (0.05) |
| Example 37 | UVA-5 (30) | — | UVA-1 (6) | — |
| Example 38 | UVA-1 (10) | — | UVA-1 (6) | HALS-3 (0.1) |
| Example 39 | UVA-1 (10) | UV-1 (20) | UVA-1 (6) | HALS-3 (0.1) |

TABLE 2

| | Protective coating composition (parts) | | Primer (parts) | |
|---|---|---|---|---|
| | UVA | UV | UVA | HALS |
| Comparative Example 1 | UVA-7 (10) | — | UVA-7 (6) | — |
| Comparative Example 2 | UVA-7 (4) | — | UVA-7 (8) | — |
| Comparative Example 3 | UVA-7 (20) | — | UVA-7 (6) | — |
| Comparative Example 4 | UVA-8 (20) | — | UVA-7 (6) | — |
| Comparative Example 5 | — | UV-1 (2.0) | UVA-7 (6) | — |
| Comparative Example 6 | UVA-7 (10) | UV-1 (2.0) | UVA-7 (6) | — |
| Comparative Example 7 | — | — | UVA-7 (6) | — |
| Comparative Example 8 | UVA-7 (10) | — | UVA-7 (6) | HALS-1 (0.5) |

TABLE 3

| | Initial | | Weathering | |
|---|---|---|---|---|
| | Yellowing factor | Taber abrasion | Yellowing factor | Adhesion |
| Example 1 | 1.2 | 8 | 2.0 | 100/100 |
| Example 2 | 1.2 | 8 | 2.5 | 100/100 |
| Example 3 | 1.0 | 7 | 1.5 | 100/100 |
| Example 4 | 1.0 | 7 | 2.0 | 100/100 |
| Example 5 | 0.9 | 7 | 2.0 | 100/100 |
| Example 6 | 1.4 | 9 | 4.0 | 100/100 |
| Example 7 | 1.2 | 8 | 1.5 | 100/100 |
| Example 8 | 1.2 | 7 | 1.5 | 100/100 |
| Example 9 | 0.9 | 9 | 1.5 | 100/100 |
| Example 10 | 0.9 | 9 | 4.5 | 100/100 |
| Example 11 | 1.0 | 7 | 1.5 | 100/100 |
| Example 12 | 1.0 | 8 | 1.5 | 100/100 |
| Example 13 | 1.0 | 7 | 1.5 | 100/100 |
| Example 14 | 1.5 | 9 | 2.0 | 100/100 |
| Example 15 | 1.0 | 7 | 1.5 | 100/100 |
| Example 16 | 1.0 | 7 | 1.5 | 100/100 |
| Example 17 | 1.0 | 7 | 1.5 | 100/100 |
| Example 18 | 1.0 | 7 | 1.5 | 100/100 |
| Example 19 | 1.0 | 7 | 1.5 | 100/100 |
| Example 20 | 1.2 | 8 | 2.5 | 100/100 |
| Example 21 | 1.0 | 7 | 1.5 | 100/100 |
| Example 22 | 1.0 | 7 | 1.5 | 100/100 |
| Example 23 | 1.0 | 7 | 1.5 | 100/100 |
| Example 24 | 0.8 | 8 | 1.5 | 100/100 |
| Example 25 | 0.8 | 8 | 2.0 | 100/100 |
| Example 26 | 0.9 | 7 | 2.0 | 100/100 |
| Example 27 | 1.2 | 7 | 1.5 | 100/100 |
| Example 28 | 1.2 | 7 | 1.5 | 100/100 |
| Example 29 | 1.2 | 8 | 1.5 | 100/100 |
| Example 30 | 1.0 | 9 | 2.5 | 100/100 |
| Example 31 | 1.2 | 8 | 2.0 | 100/100 |
| Example 32 | 1.2 | 8 | 2.0 | 100/100 |
| Example 33 | 1.0 | 8 | 2.0 | 100/100 |
| Example 34 | 1.0 | 8 | 2.0 | 100/100 |
| Example 35 | 1.0 | 7 | 2.0 | 100/100 |
| Example 36 | 1.0 | 8 | 2.0 | 100/100 |
| Example 37 | 1.0 | 8 | 2.0 | 100/100 |
| Example 38 | 1.0 | 8 | 1.5 | 100/100 |
| Example 39 | 1.0 | 7 | 1.5 | 100/100 |

TABLE 4

| | Initial | | Weathering | |
|---|---|---|---|---|
| | Yellowing factor | Taber abrasion | Yellowing factor | Adhesion |
| Example 1 | 3.1 | 10 | 15 | 0/100 |
| Example 2 | 7.0 | 15 | 30 | 0/100 |
| Example 3 | 4.0 | 15 | 8.0 | 0/100 |
| Example 4 | 1.0 | 20 | 35 | 0/100 |
| Example 5 | 2.5 | 15 | 20 | 0/100 |
| Example 6 | 2.0 | 8 | 9.0 | 0/100 |
| Example 7 | 0.9 | 15 | 20 | 0/100 |
| Example 8 | 1.2 | 9 | 10 | 0/100 |

Plastic articles, especially of polycarbonate resin, coated with the protective coating composition of the invention possess excellent transparency, mar resistance, weather resistance, and chemical resistance. They are suitable in outdoor applications including windows and windshields in vehicles and aircraft, windows in buildings, and acoustic barriers along highways.

Next, Examples of the invention in the second aspect are given together with Comparative Examples. The abbreviations for UV absorbers and hindered amine light stabilizers used herein have the same meaning as above, and the abbreviations for organic copolymers, alkoxysilyl compounds and compositions have the following meaning.

Alkoxysilyl Group-containing Organic Copolymers

Pol-1: reaction product of Synthesis Example 7

Pol-2: reaction product of Synthesis Example 8

Pol-3: reaction product of Synthesis Example 9

Compounds Containing Nitrogen and Alkoxysilyl in a Molecule

NSi-1: ureidopropyltriethoxysilane

NSi-2: reaction product of Synthesis Example 10

Colloidal Silica-containing Organopolysiloxane Compositions

HC-1: colloidal silica-containing organopolysiloxane composition of Synthesis Example 11

HC-2: colloidal silica-containing organopolysiloxane composition of Synthesis Example 12

HC-3: colloidal silica-containing organopolysiloxane composition of Synthesis Example 13

In Examples, physical properties were measured and rated by the same procedures as above.

Examples 40–56 and Comparative Examples 9–17

The organic copolymers prepared in Synthesis Examples 7 to 9 (Pol-1 to 3), polymethyl methacrylate having an average molecular weight of 150,000, the compounds containing nitrogen and alkoxysilyl groups in a molecule (NSi-1 and NSi-2), the silyl-modified ultraviolet absorbers (UVA-1 to 6), the ultraviolet absorbers (UVA-7 to 12), and the light stabilizers (HALS-1 to 3) were mixed in the amounts shown in Tables 5 to 7. The mixtures were diluted with a 20/80 mixture of diacetone alcohol and ethylene glycol monomethyl ether so as to give a concentration of 10% as solids of the organic copolymer. In this way, undercoating compositions A to Z were prepared as shown in Tables 5 to 7.

Each of the undercoating compositions was applied onto a polycarbonate resin sheet of 0.5 mm thick, which had been surface cleaned, by the flow coating method and cured at about 120° C. for about 30 minutes, obtaining a cured undercoat of 2 to 5 μm thick. Each of the colloidal silica-containing organopolysiloxane compositions of Synthesis Examples 11 to 13 was applied onto the undercoat by the flow coating method and cured at about 120° C. for about one hour, obtaining a cured top coat of 2 to 5 μm. The thus surface-coated sheet was examined for physical properties, with the results shown in Table 8.

TABLE 5

| | Example | | | | | | | | |
|---|---|---|---|---|---|---|---|---|---|
| | 40 | 41 | 42 | 43 | 44 | 45 | 46 | 47 | 48 |
| Undercoating composition | A | B | C | D | E | F | G | H | I |
| UVA | UVA-1 20 parts | UVA-1 30 parts | UVA-1 40 parts | UVA-2 30 parts | UVA-3 30 parts | UVA-4 30 parts | UVA-5 30 parts | UVA-6 30 parts | UVA-1 30 parts |
| Organic copolymer | Pol-1 100 parts | Pol-1 100 parts | Pol-1 100 parts | Pol-2 100 parts | Pol-3 100 parts | Pol-1 100 parts | Pol-1 100 parts | Pol-1 100 parts | Pol-1 100 parts |
| Polymethyl methacrylate | — | — | — | — | — | — | — | — | — |
| NSi | — | — | — | — | — | — | — | — | — |
| HALS | — | — | — | — | — | — | — | — | — |
| Colloidal silica-containing organopolysiloxane | HC-1 | HC-1 | HC-1 | HC-1 | HC-1 | HC-2 | HC-2 | HC-2 | HC-3 |

TABLE 6

| | Example | | | | | | | |
|---|---|---|---|---|---|---|---|---|
| | 49 | 50 | 51 | 52 | 53 | 54 | 55 | 56 |
| Undercoating composition | J | K | L | M | N | O | P | Q |
| UVA | UVA-1 30 parts | UVA-1 30 parts | UVA-1 30 parts | UVA-1 27 parts + UVA-7 3 parts | UVA-1 27 parts + UVA-9 3 parts | UVA-1 27 parts + UVA-10 3 parts | UVA-1 27 parts + UVA-11 3 parts | UVA-1 27 parts + UVA-12 3 parts |
| Organic copolymer | Pol-1 100 parts | Pol-1 100 parts | Pol-2 100 parts | Pol-1 100 parts | Pol-1 100 parts | Pol-1 100 parts | Pol-1 100 parts | Pol-1 100 parts |
| Polymethyl methacrylate | 20 parts | 20 parts | 20 parts | — | — | — | 20 parts | — |
| NSi | Nsi-1 5 parts | Nsi-2 20 parts | Nsi-2 30 parts | Nsi-2 20 parts | Nsi-2 20 parts | Nsi-2 20 parts | Nsi-2 20 parts | Nsi-2 20 parts |
| HALS | HALS-1 10 parts | HALS-2 10 parts | HALS-3 6 parts | HALS-1 3 parts | HALS-3 10 parts | HALS-3 6 parts | HALS-1 2 parts | HALS-1 2 parts |
| Colloidal silica-containing organopolysiloxane | HC-1 | HC-1 | HC-3 | HC-3 | HC-3 | HC-3 | HC-3 | HC-3 |

TABLE 7

| | Example | | | | | | | | |
|---|---|---|---|---|---|---|---|---|---|
| | 9 | 10 | 11 | 12 | 13 | 14 | 15 | 16 | 17 |
| Undercoating composition | R | S | T | U | V | W | X | Y | Z |
| UVA | UVA-7 10 parts | UVA-7 20 parts | UVA-7 10 parts | UVA-8 20 parts | UVA-9 20 parts | UVA-10 20 parts | UVA-11 20 parts | UVA-12 20 parts | UVA-7 20 parts |
| Organic copolymer | Pol-1 100 parts | Pol-1 100 parts | Pol-1 100 parts | Pol-2 100 parts | Pol-3 100 parts | Pol-1 100 parts | Pol-1 100 parts | Pol-2 100 parts | Pol-1 100 parts |
| Polymethyl methacrylate | — | — | — | — | — | — | — | — | 20 parts |
| NSi | — | — | — | — | — | — | — | — | Nsi-2 20 parts |
| HALS | — | HALS-2 3 parts | — | — | — | HALS-3 3 parts | — | — | HALS-2 1 parts |
| Colloidal silica- | HC-1 | HC-1 | HC-3 | HC-3 | HC-1 | HC-2 | HC-2 | HC-2 | HC-1 |

TABLE 7-continued

| | Example | | | | | | | | |
|---|---|---|---|---|---|---|---|---|---|
| | 9 | 10 | 11 | 12 | 13 | 14 | 15 | 16 | 17 |
| containing organopolysiloxane | | | | | | | | | |

TABLE 8

| | Initial | | Weathering | |
|---|---|---|---|---|
| | Yellowing factor | Taber abrasion | Yellowing factor | Adhesion |
| Example 40 | 1.0 | 8 | 1.5 | 100/100 |
| Example 41 | 1.5 | 8 | 1.5 | 100/100 |
| Example 42 | 1.5 | 7 | 2.0 | 100/100 |
| Example 43 | 1.0 | 8 | 1.5 | 100/100 |
| Example 44 | 0.9 | 8 | 1.5 | 100/100 |
| Example 45 | 1.0 | 9 | 1.5 | 100/100 |
| Example 46 | 1.0 | 9 | 2.0 | 100/100 |
| Example 47 | 1.2 | 7 | 2.0 | 100/100 |
| Example 48 | 1.0 | 8 | 1.5 | 100/100 |
| Example 49 | 1.0 | 9 | 2.5 | 100/100 |
| Example 50 | 1.0 | 8 | 2.0 | 100/100 |
| Example 51 | 1.0 | 8 | 1.0 | 100/100 |
| Example 52 | 1.5 | 7 | 2.5 | 100/100 |
| Example 53 | 1.5 | 9 | 2.0 | 100/100 |
| Example 54 | 1.0 | 8 | 1.5 | 100/100 |
| Example 55 | 1.0 | 8 | 1.5 | 100/100 |
| Example 56 | 1.0 | 7 | 1.5 | 100/100 |
| Example 9 | 4.0 | 15 | 15 | 0/100 |
| Example 10 | 8.0 | 20 | 30 | 0/100 |
| Example 11 | 4.0 | 15 | 8.0 | 0/100 |
| Example 12 | 1.5 | 20 | 35 | 0/100 |
| Example 13 | 1.0 | 8 | 15 | 100/100 |
| Example 14 | 3.0 | 11 | 20 | 100/100 |
| Example 15 | 2.0 | 10 | 15 | 100/100 |
| Example 16 | 2.0 | 10 | 15 | 100/100 |
| Example 17 | 4.0 | 11 | 20 | 50/100 |

The undercoating compositions of the invention, when applied to plastic articles, especially of polycarbonate resin, impart excellent transparency, mar resistance, weather resistance, and chemical resistance thereto. The coated articles are suitable in outdoor applications including windows and windshields in vehicles and aircraft, windows in buildings, and acoustic barriers along highways.

Japanese Patent Application Nos. 11-274059 and 11-10 274060 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A protective coating composition having improved weather resistance, comprising
   (1) 0.1 to 50 parts by weight of a reaction product obtained by reacting a hydroxyl group-containing benzophenone compound with a silane and/or a (partial) hydrolyzate thereof in the presence of a quaternary ammonium salt catalyst, and
   (2) 100 parts by weight of a silane compound of the following general formula (C) and/or a (partial) hydrolyzate thereof:

$$R^4{}_m SiR^2{}_n (OR^3)_{4-m-n} \quad (C)$$

wherein $R^4$ is a substituted or unsubstituted monovalent hydrocarbon group of 1 to 10 carbon atoms, $R^2$ is an alkyl group of 1 to 10 carbon atoms or aryl group, $R^3$ is hydrogen or a substituted or unsubstituted monovalent hydrocarbon group of 1 to 10 carbon atoms which may contain an oxygen atom, m and n each are equal to 0, 1 or 2, and the sum of m and n is equal to 0, 1 or 2.

2. The protective coating composition of claim 1 further comprising (3) 0.1 to 100 parts by weight of a microparticulate inorganic oxide containing at least one atom selected from titanium, cerium and zinc, and capable of absorbing light with a wavelength of up to 400 nm.

3. The protective coating composition of claim 1 wherein component (1) is a reaction product obtained by reacting a compound of the general formula (A):

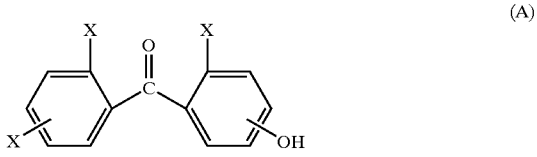

(A)

wherein X, which may be the same or different, is hydrogen or a hydroxyl group, at least one X being a hydroxyl group, with an epoxy group-containing silane of the following general formula (B) and/or a (partial) hydrolyzate thereof:

$$R^1{}_a SiR^{2b}(OR^3)_{4-a-b} \quad (B)$$

wherein $R^1$ is an epoxy group-containing organic group, $R^2$ is an alkyl group of 1 to 10 carbon atoms or aryl group, $R^3$ is hydrogen or a substituted or unsubstituted monovalent hydrocarbon group of 1 to 10 carbon atoms which may contain an oxygen atom, a is equal to 1 or 2, b is equal to 0 or 1, and the sum of a and b is equal to 1 or 2, in the presence of said quaternary ammonium salt catalyst.

4. The protective coating composition of claim 1, wherein said quaternary ammonium salt is selected from the group consisting of tetramethylammonium chloride, tetraethylammonium chloride, benzyltrimethylammonium chloride, and benzyltriethylammonium chloride.

5. The protective coating composition of claim 1, wherein said catalyst is present in an amount of 0.005 to 10 parts by weight per 100 parts by weight of said hydroxyl-group containing benzophenone compound and said silane and/or said (partial) hydrolyzate thereof combined.

6. The protective coating composition of claim 1, wherein said hydroxyl-group containing benzophenone compound is reacted with said silane and/or said (partial) hydrolyzate thereof in the presence of said catalyst at a temperature of 50 to 150° C. for about 4 to 20 hours.

7. A protective coating composition having improved weather resistance, comprising a co-hydrolyzate resulting from co-hydrolysis of:
   (1) 0.1 to 50 parts by weight of a reaction product obtained by reacting a hydroxyl group-containing benzophenone compound with a silane and/or a (partial) hydrolyzate thereof in the presence of a quaternary ammonium salt catalyst, and (2) 100 parts by weight of a silane compound of the following general formula (C) and/or a (partial) hydrolyzate thereof:

$R^4{}_m SiR^2{}_n (OR^3)_{4-m-n}$     (C)

wherein $R^4$ is a substituted or unsubstituted monovalent hydrocarbon group of 1 to 10 carbon atoms, $R^2$ is an alkyl group of 1 to 10 carbon atoms or aryl group, $R^3$ is hydrogen or a substituted or unsubstituted monovalent hydrocarbon group of 1 to 10 carbon atoms which may contain an oxygen atom, m and n each are equal to 0, 1 or 2, and the sum of m and n is equal to 0, 1 or 2.

8. The protective coating composition of claim 7 further comprising (3) 0.1 to 100 parts by weight of a microparticulate inorganic oxide containing at least one atom selected from titanium, cerium and zinc, and capable of absorbing light with a wavelength of up to 400 nm.

9. The protective coating composition of claim 7 wherein component (1) is a reaction product obtained by reacting a compound of the general formula (A):

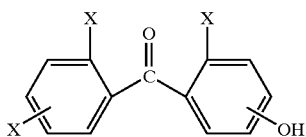

(A)

wherein X, which may be the same or different, is hydrogen or a hydroxyl group, at least one X being a hydroxyl group, with an epoxy group-containing silane of the following general formula (B) and/or a (partial) hydrolyzate thereof:

$R^1{}_a SiR^2{}_b (OR^3)_{4-a-b}$     (B)

wherein $R^1$ is an epoxy group-containing organic group, $R^2$ is an alkyl group of 1 to 10 carbon atoms or aryl group, $R^3$ is hydrogen or a substituted or unsubstituted monovalent hydrocarbon group of 1 to 10 carbon atoms which may contain an oxygen atom, a is equal to 1 or 2, b is equal to 0 or 1, and the sum of a and b is equal to 1 or 2, in the presence of said quaternary ammonium salt catalyst.

10. The protective coating composition of claim 7, wherein said quaternary ammonium salt is selected from the group consisting of tetramethylammonium chloride, tetraethylammonium chloride, benzyltrimethylammonium chloride, and benzyltriethylammonium chloride.

11. The protective coating composition of claim 7, wherein said catalyst is present in an amount of 0.005 to 10 parts by weight per 100 parts by weight of said hydroxyl-group containing benzophenone compound and said silane and/or said (partial) hydrolyzate thereof combined.

12. The protective coating composition of claim 7, wherein said hydroxyl-group containing benzophenone compound is reacted with said silane and/or said (partial) hydrolyzate thereof in the presence of said catalyst at a temperature of 50 to 150° C. for about 4 to 20 hours.

13. The protective coating composition of claim 1 or 7 further comprising (4) 1 to 200 parts by weight of colloidal silica per 100 parts by weight of component (2).

14. An article comprising a substrate and a weather resistant protective coating formed on a surface of the substrate from the protective coating composition of claim 1 or 7.

15. The article of claim 14 further comprising a primer layer between the substrate and the protective coating.

16. The article of claim 15 wherein the primer comprises a hydrolyzable silyl group-containing vinyl polymer.

17. The article of claim 15 wherein the primer comprises a UV-absorbing organic compound.

18. The article of claim 15 wherein the primer comprises a vinyl polymer having a UV-absorbing group on a side chain.

19. The article of claim 14 wherein the substrate is a plastic substrate.

20. The article of claim 19 wherein the substrate is comprised of a polycarbonate resin.

21. The article of claim 19 wherein the substrate is transparent.

22. An undercoating composition comprising
(1) 0.1 to 50 parts by weight of a reaction product obtained by reacting a hydroxyl group-containing benzophenone compound with a silane and/or a (partial) hydrolyzate thereof in the presence of a quaternary ammonium salt catalyst, and
(5) 100 parts by weight of an organic copolymer comprising 0.1 to 50% by weight of an alkoxysilyl group-containing acrylic and/or vinyl monomer and 99.9 to 50% by weight of another monomer copolymerizable therewith.

23. The undercoating composition of claim 22 wherein the reaction product and/or the (partial) hydrolyzate thereof is a reaction product obtained by reacting a compound of the following general formula (A):

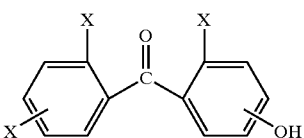

(A)

wherein X, which may be the same or different, is hydrogen or a hydroxyl group, at least one X being a hydroxyl group, with an epoxy group-containing silane of the following general formula (B) and/or a (partial) hydrolyzate thereof:

$R^1{}_a SiR^{2b}(OR^3)_{4-a-b}$     (B)

wherein $R^1$ is an epoxy group-containing organic group, $R^2$ is an alkyl group of 1 to 10 carbon atoms or aryl group, $R^3$ is hydrogen or a substituted or unsubstituted monovalent hydrocarbon group of 1 to 10 carbon atoms which may contain an oxygen atom, a is equal to 1 or 2, b is equal to 0 or 1, and the sum of a and b is equal to 1 or 2, in the presence of said quaternary ammonium salt catalyst.

24. The undercoating composition of claim 22 further comprising (6) 0.1 to 50 parts by weight of a compound containing a nitrogen atom and an alkoxysilane group in a molecule.

25. The undercoating composition of claim 24 wherein the compound (6) contains at least one nitrogen atom and at least two alkoxysilyl groups in a molecule.

26. The undercoating composition of claim 22 further comprising (7) 0.1 to 10 parts by weight of a light stabilizer having at least one cyclic hindered amine structure in a molecule.

27. A method for protecting a surface of a plastic substrate, comprising the steps of:
(i) applying an organic solvent solution of the undercoating composition of claim 16 onto a plastic substrate, (ii) evaporating the organic solvent and curing the coating of the undercoating composition, (iii) applying an organopolysiloxane composition onto the cured undercoating composition, said organopolysiloxane composition comprising colloidal silica and a hydrolyzate or co-hydrolyzate of a silane compound of the following general formula (C'):

$$R^5{}_m SiR^2{}_n(OR^3)_{4-m-n} \quad (C')$$

wherein $R^5$ is selected from the class consisting of a $C_{1-10}$ alkyl group, an aryl group, halogenated alkyl group, halogenated aryl group, alkenyl group and an organic group having an epoxy, (meth)acryloxy, mercapto, amino or cyano group, $R^2$ is an alkyl group of 1 to 10 carbon atoms or aryl group, $R^3$ is hydrogen or a substituted or unsubstituted monovalent hydrocarbon group of 1 to 10 carbon atoms which may contain an oxygen atom, m and n each are equal to 0, 1 or 2, and the sum of m and n is equal to 0, 1 or 2, and (iv) heating the coating of the organopolysiloxane composition for curing.

28. The method of claim 27 wherein the plastic substrate is comprised of a polycarbonate resin.

29. The method of claim 28 wherein the polycarbonate resin is transparent.

30. A method for protecting a surface of a plastic substrate, comprising the steps of:

(i) applying an organic solvent solution of the undercoating composition of claim 16 onto a plastic substrate, (ii) evaporating the organic solvent and curing the coating of the undercoating composition, (iii) applying a protective coating composition onto the cured undercoating composition, said protective coating composition comprising (1) 0.1 to 50 parts by weight of a reaction product obtained by reacting a hydroxyl group-containing benzophenone compound with a silane and/or a (partial) hydrolyzate thereof in the presence of a catalyst, and (2) 100 parts by weight of a silane compound of the following general formula (C) and/or a (partial) hydrolyzate thereof:

$$R^4{}_m SiR^2{}_n(OR^3)_{4-m-n} \quad (C)$$

wherein $R^4$ is a substituted or unsubstituted monovalent hydrocarbon group of 1 to 10 carbon atoms, $R^2$ is an alkyl group of 1 to 10 carbon atoms or aryl group, $R^3$ is hydrogen or a substituted or unsubstituted monovalent hydrocarbon group of 1 to 10 carbon atoms which may contain an oxygen atom, m and n each are equal to 0, 1 or 2, and the sum of m and n is equal to 0, 1 or 2, and (iv) heating the coating of the protective coating composition for curing.

31. The method of claim 30 wherein the plastic substrate is comprised of a polycarbonate resin.

32. The method of claim 31 wherein the polycarbonate resin is transparent.

33. A method for protecting a surface of a plastic substrate, comprising the steps of:

(i) applying an organic solvent solution of the undercoating composition of claim 16 onto a plastic substrate, (ii) evaporating the organic solvent and curing the coating of the undercoating composition, (iii) applying a protective coating composition onto the cured undercoating composition, said protective coating composition comprising a co-hydrolyzate resulting from co-hydrolysis of:

(1) 0.1 to 50 parts by weight of a reaction product obtained by reacting a hydroxyl group-containing benzophenone compound with a silane and/or a (partial) hydrolyzate thereof in the presence of a catalyst, and (2) 100 parts by weight of a silane compound of the following general formula (C) and/or a (partial) hydrolyzate thereof:

$$R^4{}_m SiR^2{}_n(OR^3)_{4-m-n} \quad (C)$$

wherein $R^4$ is a substituted or unsubstituted monovalent hydrocarbon group of 1 to 10 carbon atoms, $R^2$ is an alkyl group of 1 to 10 carbon atoms or aryl group, $R^3$ is hydrogen or a substituted or unsubstituted monovalent hydrocarbon group of 1 to 10 carbon atoms which may contain an oxygen atom, m and n each are equal to 0, 1 or 2, and the sum of m and n is equal to 0, 1 or 2, and (iv) heating the coating of the protective coating composition for curing.

34. The method of claim 33 wherein the plastic substrate is comprised of a polycarbonate resin.

35. The method of claim 34 wherein the polycarbonate resin is transparent.

36. The undercoating composition of claim 22, wherein said quaternary ammonium salt is selected from the group consisting of tetramethylammonium chloride, tetraethylammonium chloride, benzyltrimethylammonium chloride, and benzyltriethylammonium chloride.

37. The undercoating composition of claim 22, wherein said catalyst is present in an amount of 0.005 to 10 parts by weight per 100 parts by weight of said hydroxyl-group containing benzophenone compound and said silane and/or said (partial) hydrolyzate thereof combined.

38. The undercoating composition of claim 22, wherein said hydroxyl-group containing benzophenone compound is reacted with said silane and/or said (partial) hydrolyzate thereof in the presence of said catalyst at a temperature of 50 to 150° C. for about 4 to 20 hours.

* * * * *

UNITED STATES PATENT AND TRADEMARK OFFICE
CERTIFICATE OF CORRECTION

PATENT NO.     : 6,497,964 B1
DATED          : December 24, 2002
INVENTOR(S)    : Kazuyuki Matsumura et al.

It is certified that error appears in the above-identified patent and that said Letters Patent is hereby corrected as shown below:

<u>Title page,</u>
Item [73], Assignees, replace " Assignees:  Shin-Etsu Chemical Co., Ltd., Tokyo (JP); Kabushi Kaishi Toyoda Jidoshokki Seisakusho, Kariya (JP)" with
-- Assignees:  Shin-Etsu Chemical Co., Ltd., Tokyo (JP); Kabushiki Kaisha Toyoda Jidoshokki Seisakusho, Kariya (JP) --.

Signed and Sealed this

Twenty-sixth Day of August, 2003

JAMES E. ROGAN
*Director of the United States Patent and Trademark Office*